(12) United States Patent
Cideciyan et al.

(10) Patent No.: US 11,862,194 B1
(45) Date of Patent: Jan. 2, 2024

(54) ADAPTIVE DATA DETECTION ON A NONLINEAR CHANNEL

(71) Applicant: International Business Machines Corporation, Armonk, NY (US)

(72) Inventors: Roy Cideciyan, Rüschlikon (CH); Simeon Furrer, Altdorf (CH); Mark Alfred Lantz, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/060,602

(22) Filed: Dec. 1, 2022

(51) Int. Cl.
*G11B 20/10* (2006.01)
*G11B 20/24* (2006.01)
*G11B 5/55* (2006.01)

(52) U.S. Cl.
CPC .. *G11B 20/10287* (2013.01); *G11B 20/10046* (2013.01); *G11B 20/24* (2013.01); *G11B 5/5586* (2013.01)

(58) Field of Classification Search
None
See application file for complete search history.

(56) References Cited

U.S. PATENT DOCUMENTS

| | | | |
|---|---|---|---|
| 4,237,463 A | 12/1980 | Bjor et al. | |
| 5,784,415 A | 7/1998 | Chevillat et al. | |
| 6,104,766 A | 8/2000 | Coker et al. | |
| 6,201,839 B1 | 3/2001 | Kavcic et al. | |
| 6,438,180 B1 | 8/2002 | Kavcic et al. | |
| 6,625,235 B1 | 9/2003 | Coker et al. | |
| 6,678,105 B2 | 1/2004 | Melas | |
| 7,173,783 B1 | 2/2007 | McEwen et al. | |
| 8,670,199 B2 | 3/2014 | Blinick et al. | |
| 8,693,121 B1 | 4/2014 | McNeill et al. | |
| 9,542,973 B1 | 1/2017 | Furrer et al. | |

FOREIGN PATENT DOCUMENTS

JP 2006318548 A 11/2006

OTHER PUBLICATIONS

Bergmans, Jan W.M., "Adaptive signal processing systems", Lecture Notes, Aug. 18, 2006, 186 Pages.
Eleftheriou et al., "Adaptive noise-predictive maximum-likelihood (NPML) data detection for magnetic tape storage systems", IBM Journal of Research and Development, vol. 54, Issue: 2, Mar.-Apr. 2010, 10 Pages.

(Continued)

*Primary Examiner* — Craig A. Renner
(74) *Attorney, Agent, or Firm* — Stephanie L. Carusillo

(57) ABSTRACT

A data storage system comprises: a head configured to produce a signal representing data stored on a storage medium; an estimator configured to determine an estimated signal comprising a superposition of an estimated linear portion of a partial-response equalizer output and an estimated nonlinear portion of the signal; a bank of noise whitening filters configured for filtering a difference between the signal and the estimated signal; a branch metric calculator configured to calculate branch metrics based on the filtered signal; and an adaptive data-dependent noise-predictive maximum likelihood sequence detector configured to generate an output stream representing the data based on the one or more branch metrics.

18 Claims, 11 Drawing Sheets

(56) References Cited

OTHER PUBLICATIONS

Eleftheriou et al., "Noise-Predictive Maximum-likelihood (NPML) Detection for the Magnetic Recording Channel", Proceedings of ICC/SUPERCOMM '96—International Conference on Communications, Dallas, Texas, USA, Jun. 23-27, 1996, 5 Pages.
Fisher et al., "An Adaptive RAM-DFE for Storage Channels", IEEE Transactions on Communications, vol. 39, No. 11, Nov. 1991, 10 Pages.
Kavcic et al., "Correlation-Sensitive Adaptive Sequence Detection", IEEE Transactions on Magnetics, vol. 34, No. 3, May 1998, 9 Pages.
Olcer et al., "NPML Detection Employing IIR Noise-Prediction with Application to Magnetic Tape Storage", 2011 IEEE Global Telecommunications Conference—GLOBECOM 2011, Houston, Texas, USA, Dec. 5-9, 2011, 6 Pages.

ADAPTIVE DATA DETECTION ON A NONLINEAR CHANNEL

BACKGROUND

The present invention relates generally to the field of data detection, and more particularly to detection of data from a distorted and/or noisy signal on a channel.

Data storage on magnetic tape plays an important role in long-term data storage and archiving, system backup, and data exchange. Data recovery at high data rates from magnetic tape or other storage media featuring high information density may deploy noise-predictive detection schemes, where noise prediction may be performed using a linear estimate of the signal at the output of a partial-response class-4 (PR4) equalizer although the PR4-equalized signal exhibits nonlinearity. The magnetic tape channel, which includes the processes of writing and reading data, is nonlinear. The process of writing binary data on magnetic tape based on saturation recording is highly nonlinear and suffers from nonlinear transition shifts (NLTS) and hard transition shifts of written transitions as a function of previously written transitions due to nonlinear interactions between stored flux regions. Although nonlinear transition shifts can be reduced by write compensation, they cannot be eliminated.

The readback process of binary written data also suffers from nonlinearities due to the intrinsic nonlinear response of a magneto-resistive read transducer. Although read nonlinearity can be reduced by careful biasing of the current flowing through a magneto-resistive read transducer and the use of tape having a thin magnetic layer with high remanence magnetization, it cannot be eliminated. Known approaches of noise-predictive detection use a finite-state machine to represent a storage channel for the linear estimate of the PR4 signal.

SUMMARY

In one aspect, the invention relates to a data storage system, comprising:
 a head configured to produce a signal representing data stored on a storage medium;
 an estimator configured to determine an estimated signal from the signal, the estimated signal comprising a superposition of an estimated linear portion of a partial-response equalizer output and an estimated nonlinear portion of the signal;
 a bank of noise whitening filters configured to apply one or more noise whitening filters to a difference between the signal and the estimated signal to produce a filtered signal;
 a branch metric calculator configured to perform one or more branch metric calculations on a metric input signal based on the filtered signal to generate one or more branch metrics; and
 an adaptive data-dependent noise-predictive maximum likelihood sequence detector configured to generate an output stream representing the data based on the one or more branch metrics.

In another aspect, the invention relates to a method comprising:
 receiving, from a head, a signal representing data stored on a storage medium;
 receiving, from an estimator, an estimated signal comprising a superposition of an estimated linear portion of a partial-response equalizer output and an estimated nonlinear portion of the signal;
 applying one or more noise whitening filters to a difference between the signal and the estimated signal to produce a filtered signal;
 performing one or more branch metric calculations on a metric input signal based on the filtered signal to produce one or more branch metrics;
 generating an output stream representing the data based on the one or more branch metrics; and
 based on the signal and the output stream, updating the estimated signal.

In a further aspect, the invention relates to a computer program product comprising a computer readable storage medium having program instructions embodied therewith, the program instructions being executable by a processing circuit to cause the processing circuit to:
 receive, from a head, a signal representing data stored on a storage medium;
 receive, from an estimator, an estimated signal comprising a superposition of an estimated linear portion of a partial-response equalizer output and an estimated nonlinear portion of the signal;
 apply one or more noise whitening filters to a difference between the signal and the estimated signal to produce a filtered signal;
 perform one or more branch metric calculations on a metric input signal based on the filtered signal to produce one or more branch metrics;
 generate an output stream representing the data based on the one or more branch metrics; and
 based on the signal and the output stream, update the estimated signal.

BRIEF DESCRIPTION OF THE DRAWINGS

In the following, embodiments of the invention are explained in greater detail, by way of example only, making reference to the drawings in which.

DETAILED DESCRIPTION

Figure 1:
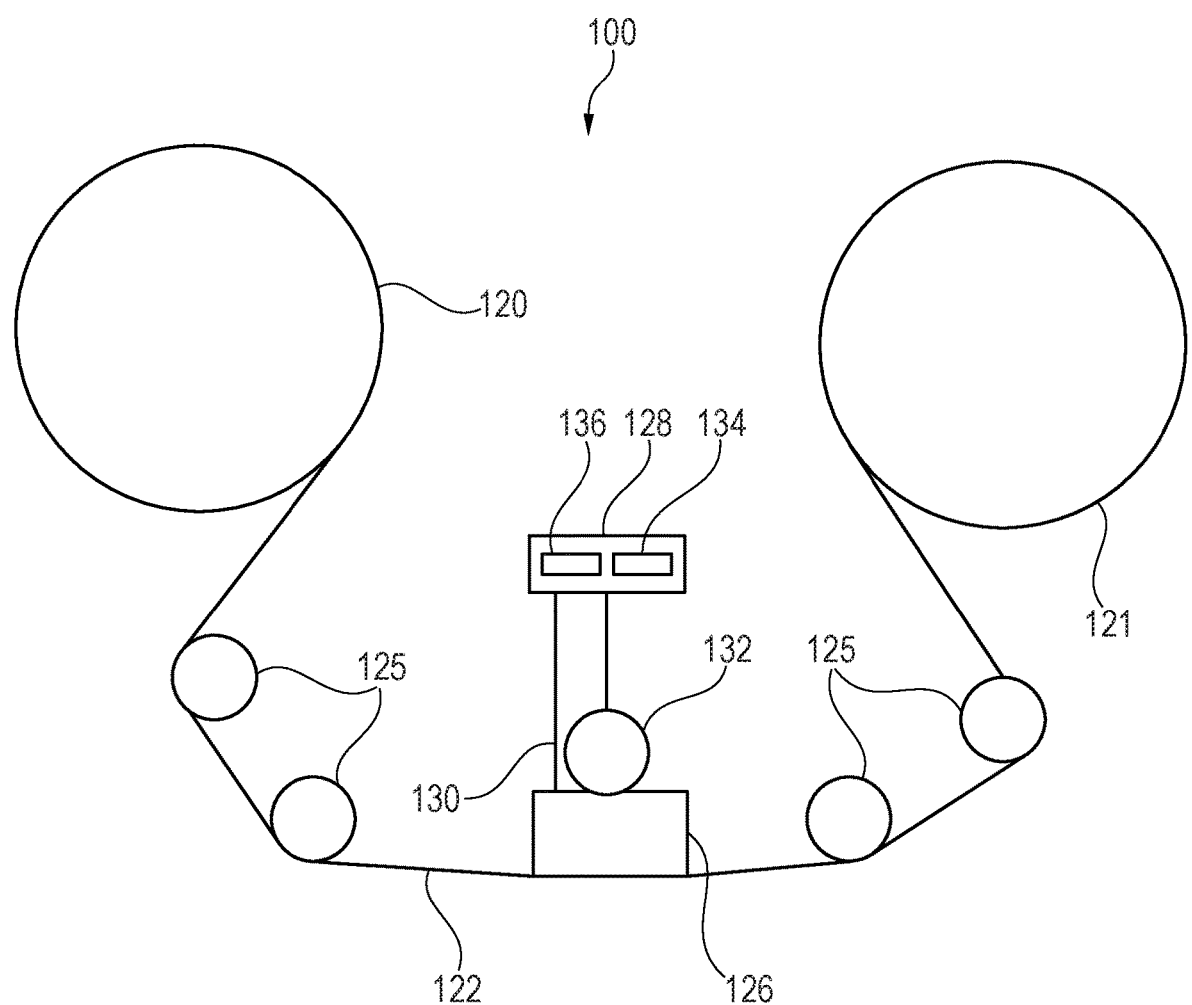
FIG. 1 schematically depicts interior components of a tape drive in accordance with an embodiment of the present invention.

Magnetic tape drives are a widespread example of data storage systems where nonlinear effects within the recording channel can have a significant influence on the signal. Tape channels are characterized by significant nonlinear distortion that are caused by, for example, nonlinear transition shifts (NLTS), nonlinearities of magneto-resistive sensors, and transition jitter. It is desirable to take into account such nonlinear effects to increase signal fidelity at the output of a finite-state noise-predictive maximum-likelihood detector.

Embodiments of the invention are not limited to data recovery from magnetic tapes but can rather be implemented with any data channel having non-negligible nonlinear distortion. However, in favor of better comprehensibility, the present disclosure refrains from describing analogous technical features in other storage systems. Without limitation, other kinds of storage systems where embodiments of the present invention may be advantageously deployed may include other magnetic storage systems such as hard disk drives, floppy disks, and the like, as well as further storage techniques where reading the stored information includes measuring the physical state of a moving medium at high data rates, such as optical storage systems.

Embodiments of the data storage system as well as individual functions thereof, of the method as well as individual steps thereof, and of the computer program product as well as individual program instructions embodied therewith may be implemented by or using analog or digital circuitry, including, but not limited to, logic gates, integrated logic circuits, electronic circuitry and devices including processors and memory, optical computing devices and components, machine-learning devices and structures including artificial neural networks, and the like, and combinations thereof.

This disclosure presents adaptive detection schemes that may reduce nonlinearity in the equalized signal prior to noise prediction. Embodiments of the invention include or make use of an estimator that, e.g., is configured to determine a superposition of an estimated nonlinear symbol that may occur as an output of a linear partial-response equalizer and an estimated nonlinear portion of the signal. For this purpose, the estimator may subtract a current estimate of a signal representing a symbol from the incoming signal. The symbol to be subtracted may comprise a superposition of an estimated linear portion of the partial-response equalizer output (i.e., the symbol as it would be provided by the equalizer, e.g., a PR4 equalizer, if the read channel was purely linear) and an estimated nonlinear portion of the signal that may be continuously updated.

By determining said difference, the estimator may obtain an estimation error that coincides with the actual current nonlinear portion of the signal if the subtracted estimated symbol is identical to the symbol currently encoded by the incoming signal. The difference between the signal and the estimated linear symbol may be used to update the estimated symbol. Different embodiments of the estimator will be discussed in more detail in the following and shown in the drawings.

The estimated symbol may be initialized to ensure ordinary functioning of the estimator at all times. An exemplary choice for an initial value may be an undisturbed, theoretical value of the symbol that is free of linear or nonlinear distortion.

By virtue of the function provided by the estimator, embodiments of the invention may have the advantage of enabling a reduction in the bit error rate at the output of detectors for channels that suffer from nonlinear distortion. This may allow an increase in the linear density and/or a reduction in the number of temporary or permanent errors at the output of an error correction code (ECC) decoder within the data storage system. By modeling the partial-response equalizer output $y_k$ to be a superposition of an estimated linear portion of the partial-response equalizer output and an estimated nonlinear portion of the signal, the deterministic signal nonlinearity may be cancelled from the signal before noise prediction is performed.

According to an embodiment, the estimator is configured for storing the estimated signal as an element of an array of estimated signals, each estimated signal within the array of estimated signals being addressable by an array index comprising a possible tuple of bits in the data stream output by the adaptive data-dependent noise-predictive maximum likelihood sequence detector. According to an embodiment, the tuple comprises a possible sequence of bits in the data stream output by the adaptive data-dependent noise-predictive maximum likelihood sequence detector.

To perform a subtraction in the course of determining the estimated signal, it may be beneficial to store the number to be subtracted, such as the estimated linear portion of a partial-response equalizer output or the estimated nonlinear portion of the signal, in a memory such as a random-access memory (RAM). In this way, the estimator may be implemented as an adaptive nonlinear table look-up filter.

Estimating multiple estimated signals, wherein each of the multiple estimated signals is uniquely assigned to one out of a plurality of bit tuples or sequences that may occur in the output of the adaptive data-dependent noise-predictive maximum likelihood sequence detector, may have the advantage of making it possible to keep track of different nonlinear estimated signals that may occur for different sequences of symbols at the input of the detector. This may account for channel nonlinearity causing an influence of one or more surrounding symbols on the symbol that is currently used as a subtrahend from the signal to determine the noise residue of the signal. For instance, if the detector is a class-4 partial-response (PR4) detector that outputs a sequence $\{\hat{a}_k, \hat{a}_{k-1}, \hat{a}_{k-2}, \hat{a}_{k-3}, \hat{a}_{k-4}\}$ with k being a current time index or current value of a bit counter increasing with time, a good choice for a symbol to be subtracted from the signal may be $\hat{a}_k - \hat{a}_{k-2}$ so that the assumed linear noise portion of the signal $y_k$ would be $\tilde{n}_k = y_k - (\hat{a}_k - \hat{a}_{k-2})$. However, in a nonlinear channel, past symbols relative to $\hat{a}_{k-2}$ such as $\hat{a}_{k-3}$ and $\hat{a}_{k-4}$ as well as future symbols relative to $\hat{a}_{k-2}$ such as $\hat{a}_{k-1}$ may also contribute to the distortion of $\hat{a}_{k-2}$. Thus, still in the example, the nonlinear portion of the signal may vary as a function of the current sequence $\{\hat{a}_k, \hat{a}_{k-1}, \hat{a}_{k-2}, \hat{a}_{k-3}, \hat{a}_{k-4}\}$.

Of course, embodiments of the invention are not limited to tuples or sequences of five detector output symbols, but the estimator may likewise account for less or more bits that may even include future symbols such as $\hat{a}_{k+1}$ in some cases. Moreover, it may be feasible to have the estimator account for multiple detector output symbols that are not a sequence, but a more general tuple of symbols (e.g., $\{\hat{a}_k, \hat{a}_{k-2}, \hat{a}_{k-4}\}$) that may be found to be more likely to influence the present signal than others, while these other, less significant symbols in the sequence (in the same example, $\hat{a}_{k-1}$ and $\hat{a}_{k-3}$) may be skipped.

The sequence or tuple to be taken into account by the estimator forms an address $\underline{a}$, i.e., the array index used for looking up elements of the array of numbers stored by the estimator. The content of the array (the values in the array cells) may represent the estimated non-linear symbols at the output of the equalizer, e.g.: $\hat{s}_k = \hat{a}_k - \hat{a}_{k-2}$+nonlinear offset for a PR4 equalizer. In another embodiment discussed further below, the array may only store the nonlinear offsets while $\hat{s}_k(\underline{a})$ is determined after looking up the suitable nonlinear offset from the array. It may be advisable to dimension the memory for storing the array such that real numbers can be used to represent the nonlinear $\hat{s}_k$ symbols. In general, the array index may be formed by all possible binary sequences of a predefined fixed length, or by all possible tuples of binary numbers that may occur at predefined fixed positions within a binary sequence of predefined fixed length. In a non-limiting example, if the predefined sequence length is 5, there will be $2^5=32$ bit sequences (e.g., $\{\hat{a}_k, \ldots, \hat{a}_{k-4}\}$) that form the array index, or address space, of the array of estimated signals or offsets. Hence, in the same example, there may be 32 estimated signals, each representing one binary sequence under which a different nonlinear signal portion may arise. Embodiments are not limited to the length of 5 bits in the output stream, there may likewise be 1, 2, 3, 4, 6, or any other fixed number of bits spanning the index of the array of estimated signals.

Again, the array containing the full estimated signals may be initialized with ideal (noiseless, non-distorted) signals; and the array containing only the estimated nonlinear portions may be initialized with zeroes. For the case of the full estimated signals and PR4 equalization/symbols, the array may be initialized with $\hat{s}(\underline{a}) = \hat{a}_k - \hat{a}_{k-2}$ for all possible combinations of $\underline{a} = \{\hat{a}_k, \ldots, \hat{a}_{k-4}\}$.

It may be beneficial to implement the memory for storing the array so as to minimize the number of changes to an existing detector design such as a 16-state adaptive data-dependent noise-predictive maximum likelihood (D3-NPML) detector. In this scenario, a recommendable RAM size for storing the nonlinear symbols or offsets may be 32 cells, where the 32 RAM addresses are defined by the 32 branches of the 16-state detector trellis. On the other hand, more comprehensive designs may be possible to get the full benefit of nonlinear signal estimation. In this case, larger RAM sizes for storing the nonlinear offsets may be required, where path history/memory decisions and look-ahead bits in addition to the bits on a trellis branch may be used as the address of the RAM storing the nonlinear offsets. Using a large array RAM (e.g., a 256-cell RAM) may also yield the advantage of lowering the error rate at the output of the sequence detector by further improving nonlinear signal estimation.

According to an embodiment, the estimator comprises a memory adapted for storing the estimated signal, the estimator being configured to repeatedly: determine an estimation error comprising a difference between a previously stored estimated signal and the signal, and update the previously stored estimated signal by a superposition of the previously stored estimated signal and the estimation error.

When updating the estimated signal $\hat{s}$, the estimation error $\bar{e} = y - \hat{s}$ may be used to form a correction term $\hat{e}$ for the estimated nonlinear portion of the signal y. Updating the estimated signal, i.e., determining an updated estimated signal and storing the updated estimated signal in the estimator's memory, may have the advantage of enabling convergence of the estimated signal on a good approximation of the nonlinearly distorted signal. Within this disclosure, a good approximation shall be defined as a value that changes from one time instance k to a subsequent time instance k+1 in an amount that is within the same order of magnitude as the amount of change of the actual nonlinear portion of the signal encoding the same symbol as the estimated signal in both time instances k and k+1. In this consideration, two values shall be defined to lie within the same order of magnitude if they differ from each other by not more than 50%, preferably 10%, and more preferable 3%, i.e., if their ratio differs from unity by not more than 0.5, preferably 0.1, and more preferably 0.03.

A possible way of determining a superposition of the previously stored estimated signal and the estimation error may be a linear combination. For instance, an updated value $\hat{s}_k$ of the estimated signal may be calculated as $\hat{s}_k = c\hat{s}_{k-1} + \eta\bar{e}$, with c and $\eta$ being (e.g., positive, real) coefficients that may, but not necessarily, be chosen to fulfil the criterion $c+\eta=1$. It may however also be useful to decrease complexity by setting c to a constant value of 1 so that only $\eta$ needs to be used as a non-trivial coefficient. Preferably, but not necessarily, some or all coefficients that may be used to combine a previously stored estimated signal with a current estimation error may be constant for all time instances k. Likewise, it may be preferable, but not necessary, to use identical coefficients for all estimated signals if multiple estimated signals are maintained as disclosed herein. The aforementioned techniques and advantages of storing the estimated signal(s) or portions thereof in a memory are likewise true for the present embodiment.

According to an embodiment, the superposition of the stored estimated signal and the estimation error comprises the estimation error multiplied by a weighting factor larger than zero and smaller than one. According to an embodiment, the weighting factor has a value between 0.0001 and 0.1.

This may limit the contribution of each update to the estimated signal such that there is a factual update but convergence toward a current nonlinear symbol may take multiple iterations. Non-limiting examples of possible values of the weighting factor that may balance a higher flexibility of reacting on temporal changes of the nonlinear portion of the signal against a convergence that is more robust against high-frequency irregularities or noise are $\eta=0.1, 0.05, 0.01, 0.005, 0.001, 0.0005, 0.0001$. Choosing a weighting factor in the range between 0.1 and 0.0001 may be especially beneficial if there is a large amount of noise in the readback signal. In a magnetic tape storage device, for instance, the readback signal may contain strong portions of magnetic and thermal noise.

According to an embodiment, the estimator comprises a memory adapted for storing the estimated nonlinear portion of the signal, the estimator being configured to repeatedly: determine an estimation error comprising a difference between a previously stored estimated nonlinear portion of the signal and a difference between the signal and the estimated linear portion of a partial-response equalizer output, and update the previously stored estimated nonlinear portion of the signal by a superposition of the previously stored estimated nonlinear portion of the signal and the estimation error.

This may provide an alternative way of maintaining numerical knowledge of channel nonlinearity, with the additional benefit that current values of the estimated nonlinear portion of the signal may be accessible directly, i.e., without including the linear portion of the estimated signal. Nonetheless, embodiments of the estimator adapted for storing the estimated nonlinear portion rather than the estimated signal may be configured to provide the estimated signal as an output for further downstream processing as described herein. The aforementioned techniques and advantages of storing and updating the estimated signal(s) or portions thereof in a memory as well as of determining a superposition of a stored value and the estimation error are likewise true for the present embodiment.

According to an embodiment, the superposition of the stored estimated nonlinear portion of the signal and the estimation error comprises the estimation error multiplied by a weighting factor larger than zero and smaller than one.

As discussed above, this may limit the contribution of each update to the estimated nonlinear portion of the signal such that there is a factual update but convergence toward a current nonlinear symbol may take multiple iterations. Non-limiting examples of possible values of the weighting factor that may balance a higher flexibility of reacting on temporal changes of the nonlinear portion of the signal against a convergence that is more robust against high-frequency irregularities are η=0.1, 0.05, 0.01, 0.005, 0.001, 0.0005, 0.0001.

According to an embodiment, each of the one or more branch metric calculations comprises:

$$m_k = \left[(y_k - \hat{s}_k)\left(1 - \sum_{i=1}^{J} p_i D^i\right)\right]^2,$$

where $m_k$ is the branch metric, $y_k$ is the signal input to the estimator, $\hat{s}_k$ is the estimated signal, J is a highest order of the applicable noise whitening filter, $p_i$ are filter parameters of the applicable noise whitening filter, and D represents a delay corresponding to a bit duration.

This may be a suitable way to determine a branch metric in cases where the difference between the signal and the estimated signal (also referred to as "noise residue" or "noise portion" herein) is processed by a noise whitening filter of order J. A noise whitening filter may provide equalization of the noise portion such that the equalized noise bears a closer resemblance to a white-noise spectrum. A noise whitening filter may therefore be useful in data storage systems where channel distortion regularly causes a non-uniform frequency spectrum of the noise portion of the signal. This may contribute to a more accurate detection by (i.e., a lower error rate at the output of) the adaptive data-dependent noise-predictive maximum likelihood sequence detector due to a lower content of insignificant information in the input signals of the branch metric calculator and/or the detector.

In cases where the estimator is adapted for determining multiple estimated signals, it may be advantageous to provide a bank of noise whitening filters with at least one noise whitening filter for each combination of symbols a represented by the multiple estimated signals. In a non-limiting example, the bank of noise whitening filters comprises a separate noise whitening filter for each estimated signal provided by the estimator to enable, e.g., parallel filtering of the noise residues for each difference between the signal and one of the estimated signals. For a particular estimated signal, the at least one noise whitening filter provided for processing the difference between the signal and the particular estimated signal is referred to as the applicable noise whitening filter. Up to a technical limit, the highest filter order J may improve filtering accuracy with growing values of J. For instance, if J=3, the branch metric formula given above may represent, without limitation, a three-tap finite impulse response (FIR) filter that may be configured using three filter coefficients $p_1$, $p_2$, $p_3$.

A noise whitening filter may equalize parts of the noise spectrum in addition to any equalizing effects of the nonlinear signal estimation on the noise spectrum, i.e., the noise spectrum of the difference between the signal and the estimated nonlinear signal may be closer to a white-noise spectrum than the difference between the signal and an estimated linear (e.g., PR4 equalizer output) signal. Hence, it may be possible to choose a lower value of J (e.g., a smaller number of taps and coefficients) for a noise whitening filter in a storage system with a nonlinear signal estimator than in a system with linear signal subtraction. On the other hand, a larger value of J may provide an even closer approximation of the filter output to a white-noise spectrum.

According to an embodiment, the data storage system further comprises a data-dependent noise mean calculator configured to estimate a data-dependent noise mean from the filtered signal, each of the one or more branch metric calculations comprising:

$$m_k = \left[(y_k - \hat{s}_k)\left(1 - \sum_{i=1}^{J} p_i D^i\right) - \mu\right]^2,$$

where $m_k$ is the branch metric, $y_k$ is the signal input to the estimator, $\hat{s}_k$ is the estimated signal, J is a highest order of the applicable noise whitening filter, $p_i$ are filter parameters of the applicable noise whitening filter, D represents a delay corresponding to a bit duration, and $\mu$ is the data-dependent noise mean.

This may be a suitable way to determine a branch metric in cases where the noise portion of the signal is processed by a noise whitening filter of order J and a data-dependent noise mean calculator. In addition to the techniques and advantages outlined above for embodiments using a noise whitening filter, a noise mean calculator may be useful for setting a time average of the noise residue closer to zero by subtracting the noise mean provided by the noise mean calculator from the noise residue. A data-dependent noise mean calculator may therefore be useful in data storage systems where channel distortion regularly causes a non-zero time average in the noise portion of the signal. Noise mean calculation and subtraction may contribute to a more accurate detection by (i.e., a lower error rate at the output of) the adaptive data-dependent noise-predictive maximum likelihood sequence detector due to a lower content of insignificant information in the input signals of the branch metric calculator and/or the detector.

If the estimator is adapted for providing multiple estimated signals as a function of an address $\underline{a}$ formed by detector output symbols as described herein, the noise mean calculator may be configured for calculating one or more data-dependent noise mean(s) for some or all the different estimated signals $\hat{s}_k(\underline{a})$. For that reason, the noise means may also depend on the data sequence, i.e., they may be functions $\mu(\underline{a})$ of the address $\underline{a}$. For the purpose of illustration, a possible update routine that may be implemented by the noise mean calculator for a particular noise mean $\mu(\underline{a}^*)$ may be $\mu_{new}(\underline{a}^*)=(1-\epsilon)\ \mu_{old}(\underline{a}^*)+\epsilon\tilde{e}_k(\underline{a}^*)$, where $\tilde{e}_k(\underline{a}^*)$ may be identical to $e_k(\underline{a}^*)$ or a version of $e_k(\underline{a}^*)$ that has been processed further downstream of the bank of noise whitening filters (e.g., the metric input signal), and $\epsilon$ is a parameter that is preferably larger than zero and smaller than one and may be used for tuning the convergence behavior of the noise mean calculator similar to the parameters $\eta$ and $\alpha$ described herein.

A noise mean calculator may calculate systematic, low-frequency (compared to the inverse of the bit duration) deviations of the noise residue from zero in addition to any mean-reducing effects of the nonlinear signal estimation on the noise residue, i.e., the difference between the signal and the estimated nonlinear signal may have a baseline that is closer to zero than the difference between the signal and an estimated linear (e.g., PR4 equalizer output) signal. Hence, it may be possible that the noise mean calculator in a storage system with a nonlinear signal estimator may converge in a shorter time than it would in a system with linear signal subtraction.

According to an embodiment, the data storage system further comprises a filter parameter calculator configured to calculate one or more filter parameters for one or more of the noise whitening filters.

Filter parameters such as the parameters $p_i$ introduced above may be used to tune the effect of the noise whitening filter(s) on the noise residue where, for instance, each parameter may tune a term (e.g., tap) of one order in a polynomial filter function. In this way, the noise whitening filter may be brought to react to temporal changes in the noise spectrum. The filter parameter calculator may receive noise residue downstream of the bank of noise whitening filters as an input for determining how to update the filter parameter(s). In a non-limiting example, the filter parameter calculator comprises a bank of filter parameter calculation units to calculate multiple filter parameters, where each filter parameter calculation unit may, not necessarily, be adapted for calculating one filter parameter. If the bank of noise whitening filters comprises multiple noise whitening filters, as may be the case when the estimator is adapted for providing multiple estimated signals as described herein, the filter parameter calculator may be configured for calculating one or more filter parameter(s) for some or all of the different noise whitening filters. For that reason, filter parameters may depend on the output of the adaptive data-dependent noise-predictive maximum likelihood sequence detector, i.e., they may be functions $p_i(\underline{a})$ of the address $\underline{a}$. Furthermore, the filter parameter calculation units may take into account characteristics of the filtering order to be tuned by its respective filter parameter by receiving a corresponding internal noise residue component signal from the respective noise whitening filter as an input.

In a non-limiting example, for updating the coefficients of a 2-tap noise whitening filter providing an output signal $e_k(\underline{a})=\tilde{n}_k-p_1(\underline{a})\tilde{n}_{k-1}-p_2(\underline{a})\tilde{n}_{k-2}$, the filter parameter calculator may comprise two filter parameter update units, each of which being adapted for updating one of the filter parameters $p_i (i \in \{1, 2\})$ and receiving the respective past noise residue component signal $\tilde{n}_{k-i}$ as an input alongside $e_k(\underline{a})$. For the purpose of illustration, a possible update routine that may be implemented by the filter parameter calculator for a particular instance $p_i(\underline{a}^*)$ of one filter parameter $p_i$ may be $p_{i,new}(\underline{a}^*)=p_{i,old}(\underline{a}^*)+\alpha\tilde{e}_k(\underline{a}^*)\tilde{n}_{k-i}$, where $\tilde{e}_k(\underline{a}^*)$ may be identical to $e_k(\underline{a}^*)$ or a version of $e_k(\underline{a}^*)$ that has been processed further downstream of the bank of noise whitening filters (e.g., the metric input signal), and $\alpha$ is a parameter that is preferably larger than zero and smaller than one and may be used for tuning the convergence behavior of the noise mean calculator similar to the parameters $\eta$ and $\epsilon$ described herein.

A filter parameter calculator may calculate parameter(s) for tuning a particular noise whitening filter based on the difference $\tilde{n}_k$ between the signal and the estimated nonlinear signal (and/or one or more of its respective predecessor(s) $\tilde{n}_{k-1}, \tilde{n}_{k-2}, \ldots$) that is input to the particular noise whitening filter and/or based on the output of the particular noise whitening filter that in turn may be a function of one or more of said difference(s) $\tilde{n}_k, \tilde{n}_{k-1}, \tilde{n}_{k-2}, \ldots$ between the signal and the estimated nonlinear signal. As the estimated signal comprises an estimated nonlinear portion of the signal, said difference(s) may comprise a smaller nonlinear portion than a difference between the signal and an estimated linear (e.g., PR4 equalizer output) signal. Hence, it may be possible that the filter parameter calculator in a storage system with a nonlinear signal estimator may converge in a shorter time than it would in a system with linear signal subtraction.

To lower the error rate at the output of the adaptive data-dependent noise-predictive maximum likelihood sequence detector, it may be possible to improve noise prediction (whitening) by using more predictor coefficients. In a non-limiting example, path history/tentative decisions may be used to compute the branch metric by using more than two predictor coefficients in a 16-state detector, or more than three predictor coefficients in a 32-state detector in order to achieve better detector performance by improved noise whitening (noise prediction).

According to an embodiment, the data storage system further comprises a data-dependent noise variance calculator configured to estimate a data-dependent noise variance from the metric input signal, each of the one or more branch metric calculations comprising:

$$m_k = \ln(\sigma^2) + \left[(y_k - \hat{s}_k)\left(1 - \sum_{i=1}^{J} p_i D^i\right)\right]^2 / \sigma^2,$$

where $m_k$ is the branch metric, $\sigma$ is the data-dependent noise variance, $y_k$ is the signal input to the estimator, $\hat{s}_k$ is the estimated signal, J is a highest order of the applicable noise whitening filter, $p_i$ are filter parameters of the applicable noise whitening filter, and D represents a delay corresponding to a bit duration.

This may be a suitable way to determine a branch metric in cases where the noise portion of the signal is processed by a noise whitening filter of order J and a data-dependent noise variance calculator. In addition to the techniques and advantages outlined above for embodiments using a noise whitening filter, a noise variance calculator may be useful for canceling effects of unfavorable noise statistics that cause a non-negligible deviation of the noise variance from unity. One reason for such variance deviation may be a data dependence of the noise itself. A data-dependent noise variance calculator may therefore be useful in data storage systems where channel distortion regularly causes such noise statistics. Noise variance calculation and correction may contribute to a more accurate detection by (i.e., a lower error rate at the output of) the adaptive data-dependent noise-predictive maximum likelihood sequence detector due to a lower content of insignificant information in the input signals of the branch metric calculator and/or the detector.

A noise variance calculator may calculate noise variances deviating from unity as far as such variances have not been already accounted for by the nonlinear signal estimation, i.e., the difference between the signal and the estimated nonlinear signal may have a noise variance closer to unity than the difference between the signal and an estimated linear (e.g., PR4 equalizer output) signal. Hence, it may be possible that the noise variance calculator in a storage system with a nonlinear signal estimator may converge in a shorter time than it would in a system with linear signal subtraction.

According to an embodiment, the data storage system further comprises a delay line configured to delay the signal input to the estimator. According to an embodiment, the delay line is configured to delay the signal input to the estimator by at least 0.5 times a nominal delay time of the adaptive data-dependent noise-predictive maximum likelihood sequence detector for detecting one bit.

A delay line upstream of the estimator may increase the time a present signal $y_k$ takes before it becomes available for updating the estimated signal, the estimated nonlinear portion of the signal, and/or any other updatable parameters or values depending on $y_k$ such as noise whitening filter coefficients, noise mean values and/or noise variances, without limitation to the parameters mentioned here. During the delay imposed on the signal by the delay line, the bank of whitening filters, the branch metric calculator, and the adaptive data-dependent noise-predictive maximum likelihood sequence detector may process the signal further to determine which data sequence/address $\underline{a}^*$ is actually encoded by the signal. Therefore, there may be a higher probability that $\underline{a}^*$ is known at the time when the estimated portion(s) of the signal and the parameters depending on $y_k$, as applicable, are updated. A sufficiently large delay may increase the accuracy of the updates. Preferably, the delay is set to at least half the nominal delay time of the adaptive data-dependent noise-predictive maximum likelihood sequence detector for detecting one bit from the signal to ensure a sufficient update accuracy. It may be advantageous to select the delay imposed by the delay line such that the signal $y_k$ encoding a present symbol $a_k$ arrives at the estimator just when the determination of the symbol $a_k$ is complete. In this way, the probability of erroneously updating an estimated signal not representing the correct symbol $a_k$ may be minimized.

According to an embodiment, the storage medium is a magnetic storage medium or an optical storage medium. Without limitation, examples of magnetic storage media may include magnetic tapes, hard disk drives, floppy disks, and the like; examples of optical storage media may include compact discs (CDs), digital versatile discs (DVDs), Blu-ray discs, and various other types of optical discs such as optical archiving media. Nonlinear channel distortion effects may be especially likely to become observable on magnetic media due to the highly sequential arrangement of flux regions on the medium; intrinsic nonlinear properties of the magnetic layer of the medium, the write head arranging flux regions representing the data in the magnetic layer, and/or the head producing the signal; and the comparably high readout speeds achieved in modern magnetic storage systems. Also, optical storage systems may be prone to nonlinear effects that may occur as a consequence of interaction between light and storage medium at high velocities. Hence, the embodiments disclosed herein may be especially effective when deployed with the read channel of a magnetic or optical drive.

According to an embodiment, the adaptive data-dependent noise-predictive maximum likelihood sequence detector has N states, N being selected from the set of 4, 8, 16, 32, 64, 128.

Binary sequences of fixed length L=2, 3, 4, . . . have a total number of N=2 L=4, 8, 16, . . . possible states. To lower the error rate at the output of the adaptive data-dependent noise-predictive maximum likelihood sequence detector, one may increase the number of detector states and/or use path memory decisions with less detector states. More than 16 detector states (up to 128 detector states) can be used to improve detector performance. Alternatively, a large (e.g., 256-cell) memory may be used in conjunction with, e.g., a 16-state or a 32-state detector where path memory decisions are used to estimate the nonlinear signal component on each branch.

Referring now to FIG. 1, a simplified tape drive 100 of a tape-based data storage system is shown, which may be employed as an example of the data storage system 100 in the context of the present invention. While one specific implementation of a tape drive is shown in FIG. 1, it should be noted that the embodiments described herein may be implemented in the context of any type of tape drive system or any other kind of storage device where approaches of data recovery as disclosed herein can be applied.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the tape drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 2:
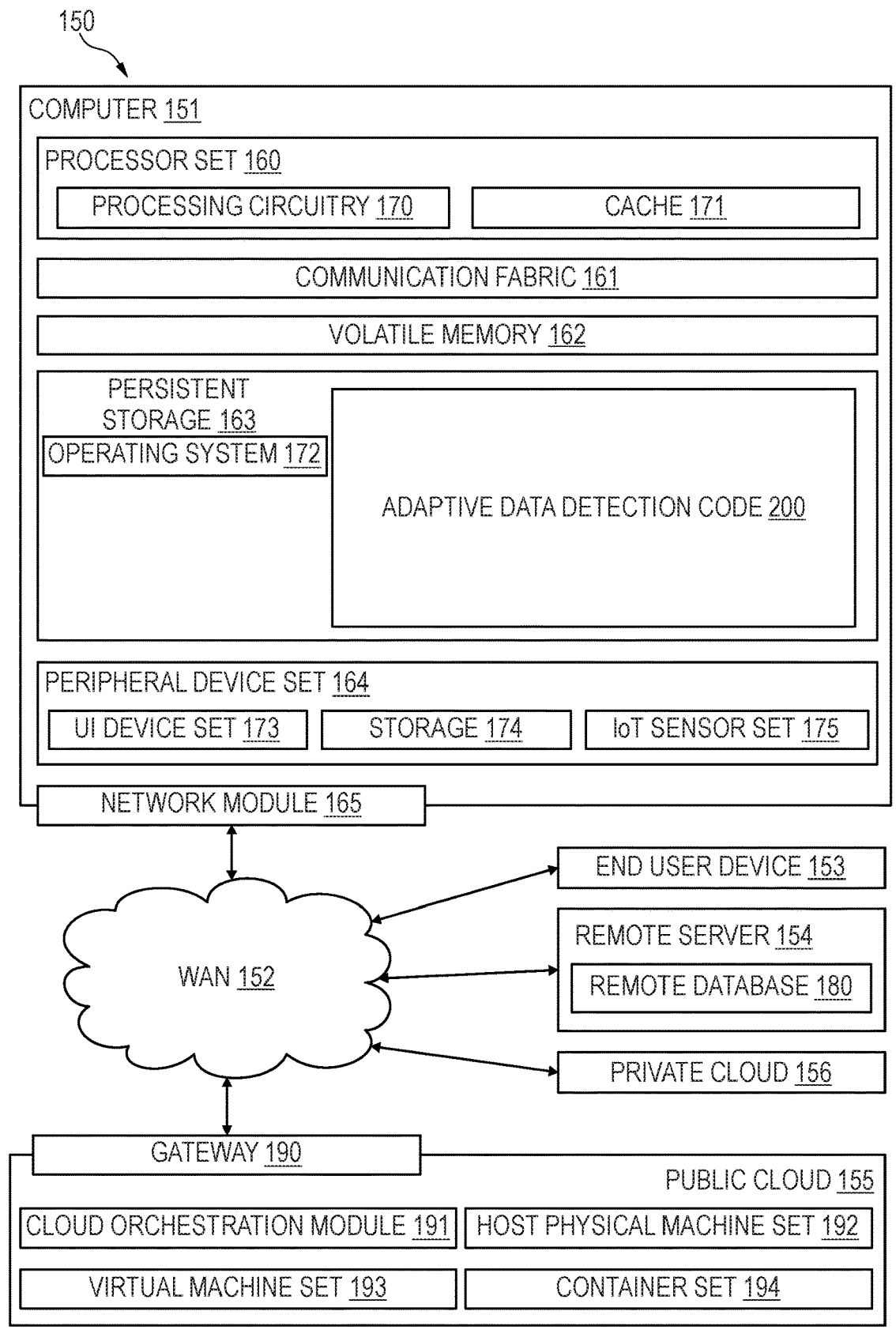
FIG. 2 is a diagram of a computing environment in accordance with an embodiment of the present invention.

Referring now to FIG. 2, computing environment 150 contains an example of an environment for the execution of at least some of the computer code involved in performing the inventive methods, such as improved adaptive data detection code 200. In addition to block 200, computing environment 150 includes, for example, computer 151, wide area network (WAN) 152, end user device (EUD) 153, remote server 154, public cloud 155, and private cloud 156. In this embodiment, computer 151 includes processor set 160 (including processing circuitry 170 and cache 171), communication fabric 161, volatile memory 162, persistent storage 163 (including operating system 172 and block 200, as identified above), peripheral device set 164 (including user interface (UI) device set 173, storage 174, and Internet of Things (IoT) sensor set 175), and network module 165. Remote server 154 includes remote database 180. Public cloud 155 includes gateway 190, cloud orchestration module 191, host physical machine set 192, virtual machine set 193, and container set 194.

COMPUTER 151 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 180. As is well understood in the art of computer technology, and depending upon the technology, performance of a computer-implemented method may be distributed among multiple computers and/or between multiple locations. On the other hand, in this presentation of computing environment 150, detailed discussion is focused on a single computer, specifically computer 151, to keep the presentation as simple as possible. Computer 151 may be located in a cloud, even though it is not shown in a cloud in FIG. 2. On the other hand, computer 151 is not required to be in a cloud except to any extent as may be affirmatively indicated.

PROCESSOR SET 160 includes one, or more, computer processors of any type now known or to be developed in the future. Processing circuitry 170 may be distributed over multiple packages, for example, multiple, coordinated integrated circuit chips. Processing circuitry 170 may implement multiple processor threads and/or multiple processor cores. Cache 171 is memory that is located in the processor chip package(s) and is typically used for data or code that should be available for rapid access by the threads or cores running on processor set 160. Cache memories are typically organized into multiple levels depending upon relative proximity to the processing circuitry. Alternatively, some, or all, of the cache for the processor set may be located "off chip." In some computing environments, processor set 160 may be designed for working with qubits and performing quantum computing.

Computer readable program instructions are typically loaded onto computer 151 to cause a series of operational steps to be performed by processor set 160 of computer 151 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 171 and the other storage media discussed below. The program instructions, and associated data, are accessed by processor set 160 to control and direct performance of the inventive methods. In computing environment 150, at least some of the instructions for performing the inventive methods may be stored in block 200 in persistent storage 163.

COMMUNICATION FABRIC 161 is the signal conduction path that allows the various components of computer 151 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 162 is any type of volatile memory now known or to be developed in the future. Examples include dynamic type random access memory (RAM) or static type RAM. Typically, volatile memory 162 is characterized by random access, but this is not required unless affirmatively indicated. In computer 151, the volatile memory 162 is located in a single package and is internal to computer 151, but, alternatively or additionally, the volatile memory may be distributed over multiple packages and/or located externally with respect to computer 151.

PERSISTENT STORAGE 163 is any form of non-volatile storage for computers that is now known or to be developed in the future. The non-volatility of this storage means that the stored data is maintained regardless of whether power is being supplied to computer 151 and/or directly to persistent storage 163. Persistent storage 163 may be a read only memory (ROM), but typically at least a portion of the persistent storage allows writing of data, deletion of data and re-writing of data. Some familiar forms of persistent storage include magnetic disks and solid state storage devices. Operating system 172 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 164 includes the set of peripheral devices of computer 151. Data communication connections between the peripheral devices and the other components of computer 151 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 173 may include components such as a display screen, speaker, microphone, wearable devices (such as goggles and smart watches), keyboard, mouse, printer, touchpad, game controllers, and haptic devices. Storage 174 is external storage, such as an external hard drive, or insertable storage, such as an SD card. Storage 174 may be persistent and/or volatile. In some embodiments, storage 174 may take the form of a quantum computing storage device for storing data in the form of qubits. In embodiments where computer 151 is required to have a large amount of storage (for example, where computer 151 locally stores and manages a large database) then this storage may be provided by peripheral storage devices designed for storing very large amounts of data, such as a storage area network (SAN) that is shared by multiple, geographically distributed computers. IoT sensor set 175 is made up of sensors that can be used in Internet of Things applications. For example, one sensor may be a thermometer and another sensor may be a motion detector.

NETWORK MODULE 165 is the collection of computer software, hardware, and firmware that allows computer 151 to communicate with other computers through WAN 152. Network module 165 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 165 are performed on the same physical hardware device. In other embodiments (for example, embodiments that utilize software-defined networking (SDN)), the control functions and the forwarding functions of network module 165 are performed on physically separate devices, such that the control functions manage several different network hardware devices. Computer readable program instructions for performing the inventive methods can typically be downloaded to computer 151 from an external computer or external storage device through a network adapter card or network interface included in network module 165.

WAN 152 is any wide area network (for example, the internet) capable of communicating computer data over non-local distances by any technology for communicating computer data, now known or to be developed in the future. In some embodiments, the WAN 152 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 153 is any computer system that is used and controlled by an end user (for example, a customer of an enterprise that operates computer 151) and may take any of the forms discussed above in connection with computer 151. EUD 153 typically receives helpful and useful data from the operations of computer 151. For example, in a hypothetical case where computer 151 is designed to provide a recommendation to an end user, this recommendation would typically be communicated from network module 165 of computer 151 through WAN 152 to EUD 153. In this way, EUD 153 can display, or otherwise present, the recommendation to an end user. In some embodiments, EUD 153 may be a client device, such as thin client, heavy client, mainframe computer, desktop computer and so on.

REMOTE SERVER 154 is any computer system that serves at least some data and/or functionality to computer 151. Remote server 154 may be controlled and used by the same entity that operates computer 151. Remote server 154 represents the machine(s) that collect and store helpful and useful data for use by other computers, such as computer 151. For example, in a hypothetical case where computer 151 is designed and programmed to provide a recommendation based on historical data, then this historical data may be provided to computer 151 from remote database 180 of remote server 154.

PUBLIC CLOUD 155 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 155 is performed by the computer hardware and/or software of cloud orchestration module 191. The computing resources provided by public cloud 155 are typically implemented by virtual computing environments that run on various computers making up the computers of host physical machine set 192, which is the universe of physical computers in and/or available to public cloud 155. The virtual computing environments (VCEs) typically take the form of virtual machines from virtual machine set 193 and/or containers from container set 194. It is understood that these VCEs may be stored as images and may be transferred among and between the various physical machine hosts, either as images or after instantiation of the VCE. Cloud orchestration module 191 manages the transfer and storage of images, deploys new instantiations of VCEs and manages active instantiations of VCE deployments. Gateway 190 is the collection of computer software, hardware, and firmware that allows public cloud 155 to communicate through WAN 152.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 156 is similar to public cloud 155, except that the computing resources are only available for use by a single enterprise. While private cloud 156 is depicted as being in communication with WAN 152, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 155 and private cloud 156 are both part of a larger hybrid cloud.

Figure 3:
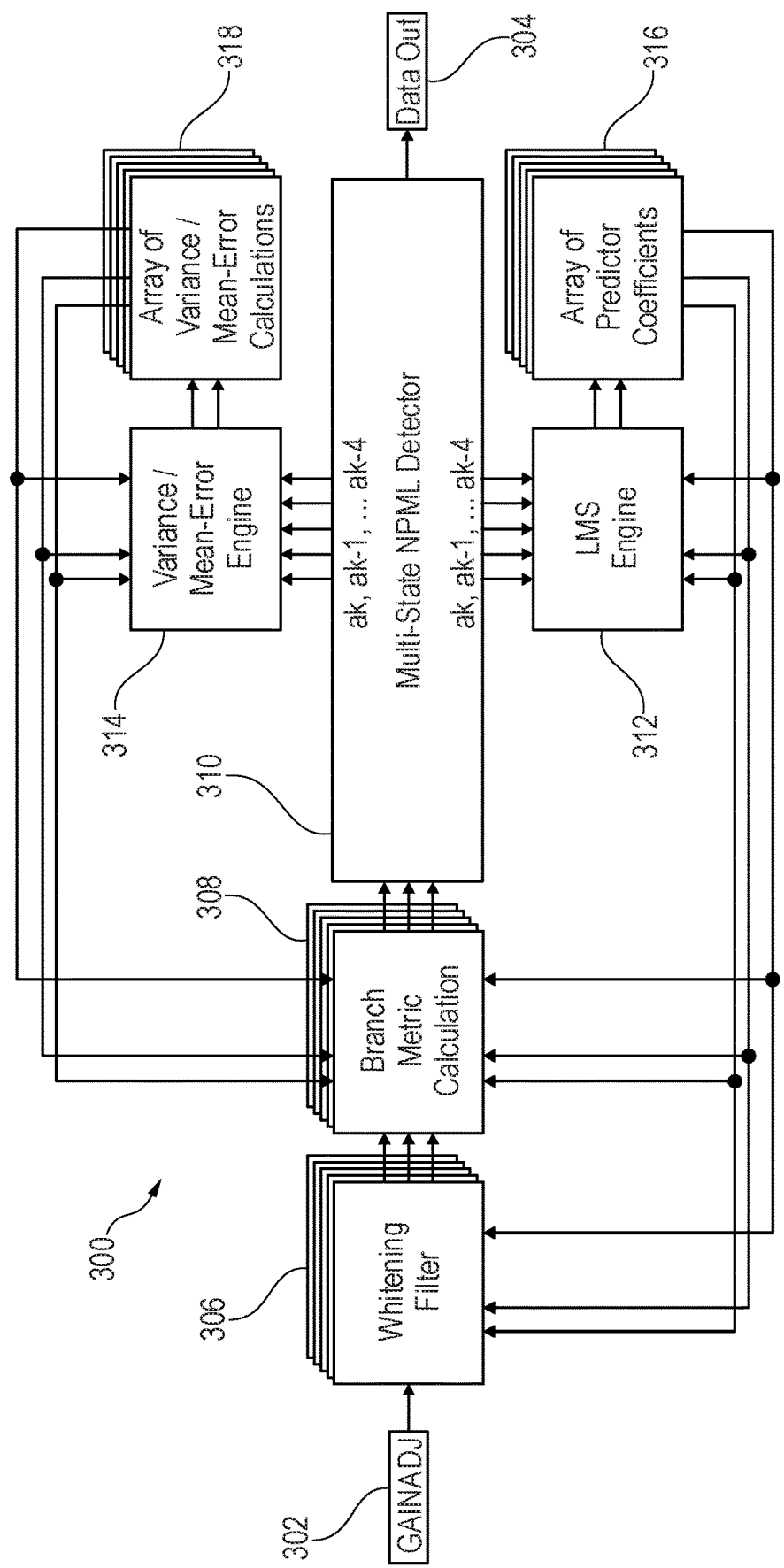
FIG. 3 is a block diagram providing an overview of a data-dependent noise-predictive maximum likelihood sequence detector in accordance with an embodiment of the present invention.

In FIG. 3, a block diagram representing components of a multi-state adaptive data-dependent noise-predictive maximum likelihood sequence detector 300 is shown. One primary input to the system, GAINADJ 302, is a sequence of digitized samples from the data channel of the data storage system, such as a magnetic tape channel, which is synchronized and gain-adjusted, according to one approach. The output of the system, Data Out 304, is a binary data associated with the input sequence. Several of the blocks are described in detail in additional figures, starting with the Whitening Filter 306 and proceeding in a clockwise manner.

As shown in FIG. 3, a multi-state adaptive data-dependent noise-predictive maximum likelihood sequence detector 300 may preferably use five primary blocks, according to one approach. Of course, more or less blocks are also possible, depending on the amount of processing desired for the input signal. Also, some blocks may be used multiple times, as indicated in FIG. 3 as a stack of blocks (e.g., the Whitening Filter 306, Branch Metric Calculation 308, etc.). One possibility of implementing a multi-state adaptive data-dependent noise-predictive maximum likelihood sequence detector 300 is a 16-state adaptive data-dependent noise-predictive maximum likelihood sequence detector. In this example, the 16-state adaptive data-dependent noise-predictive maximum likelihood sequence detector 300 may use a single 16-State NPML Detector 310, 32 copies of a two-tap Whitening Filter 306, 32 copies of a Branch Metric Calculation 308, a single LMS Engine 312 to calculate an array of 64 Predictor Coefficients 316, (e.g., 32 sets of a first predictor coefficient (W1) and 32 sets of a second predictor coefficient (W2)), and a single block 314 comprising a Variance Engine and/or a Mean-Error Engine to calculate an array of Variance Calculations 318 (e.g., an array of 64 variance coefficients comprising 32 sets of $1/\sigma^2$ coefficients and 32 sets of ln $[\sigma^2]$ coefficients, or an array of 32 sets of $\sigma^2$ coefficients) and/or an array of 32 Mean-Error Calculations 318. Of course, other configurations are also possible, such as an 8-state adaptive data-dependent noise-predictive maximum likelihood sequence detector, a 32-state adaptive data-dependent noise-predictive maximum likelihood sequence detector, a 4-state adaptive data-dependent noise-predictive maximum likelihood sequence detector, etc. Each of these configurations may also use multiple blocks, possibly in numbers different from those described in the example above. In one example, the number of multiple blocks (e.g., the Whitening Filter 306, Branch Metric Calculation 308, etc.) used may be twice the number of states of the multi-state NPML detector 310.

For the remainder of the descriptions provided herein, it is assumed that a 16-state adaptive data-dependent noise-predictive maximum likelihood sequence detector is being described, and the number of components thereof are selected based on using a 16-state NPML detector. This, however, is a convention for illustrative purposes only and is not meant to be limiting on the scope of the present invention in any manner. Of course, other configurations are also possible, such as an 8-state adaptive data-dependent noise-predictive maximum likelihood sequence detector, a 32-state adaptive data-dependent noise-predictive maximum likelihood sequence detector, a 4-state adaptive data-dependent noise-predictive maximum likelihood sequence detector, etc. Each of these configurations may also use multiple blocks, possibly in numbers different from those described in the drawings. In one example, the number of multiple blocks (e.g., the noise whitening filter(s) 306, etc.) used may be twice the number of states of the multi-state adaptive data-dependent noise-predictive maximum likelihood sequence detector core 310, 402.

In addition to the detector path illustrated by FIG. 3, the data storage system 100 may comprise a separate signal path, which is referred to herein as the update path, for updating the parameters, coefficients, and other values that the detector path uses to correctly determine the data encoded by the signal provided by the head 126. Without limitation, values to be updated for a given detector output $\underline{a}^*$ on the update path may include the estimated signal $\hat{\overline{s}}_k(\underline{a}^*)$, the estimated nonlinear offset $\hat{e}_k(\underline{a}^*)$, the filter parameter(s) $p_i(\underline{a}^*)$ used to tune the one or more noise whitening filters provided by the bank of noise whitening filters 306, the noise mean $\mu(\underline{a}^*)$, the variance $\sigma^2(\underline{a}^*)$ or any alternative feasible quantities representing the variance such as $1/\sigma^2(\underline{a}^*)$, ln $\sigma^2(\underline{a}^*)$. While the detector path may be configured to perform functions, such as filtering the signal using one or more whitening filters 306 and calculating multiple branch metrics $m_k(\underline{a})$ using the branch metric calculation 308, on multiple branches representing the different symbol sequences that may possibly be encoded by the signal, it may be advantageous to design the update path so as to update only the values pertaining to a single most probable branch $\underline{a}^*$ at a time.

Figure 6:
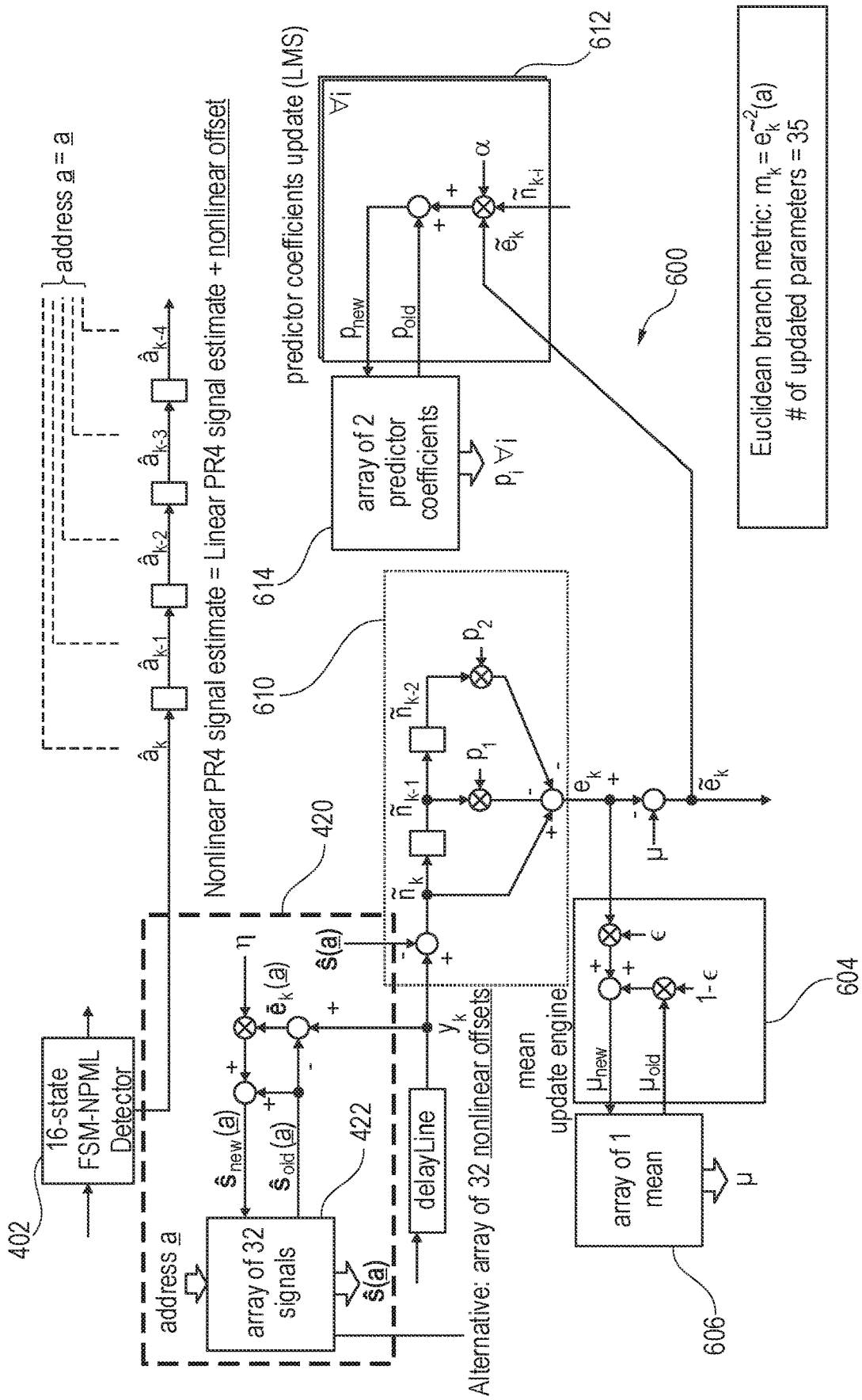
FIG. 6 is a block diagram illustrating components within an update path of a data-dependent noise-predictive maximum likelihood sequence detector including a data-independent noise mean estimator and a data-independent predictor coefficients update engine in accordance with an embodiment of the present invention.
Figure 7:
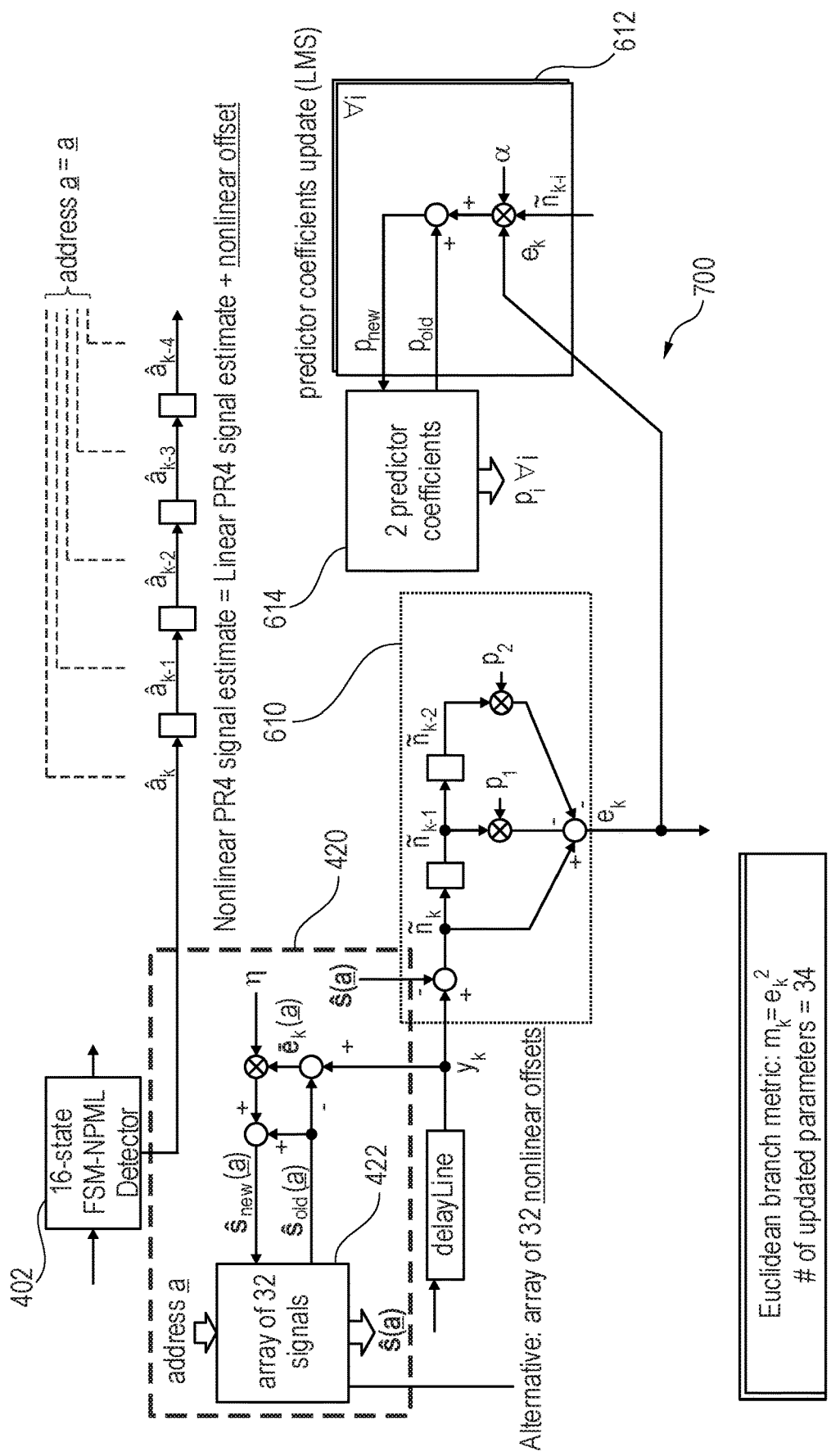
FIG. 7 is a block diagram illustrating components within an update path of a data-dependent noise-predictive maximum likelihood sequence detector including a data-independent predictor coefficients update engine in accordance with an embodiment of the present invention.
Figure 8:
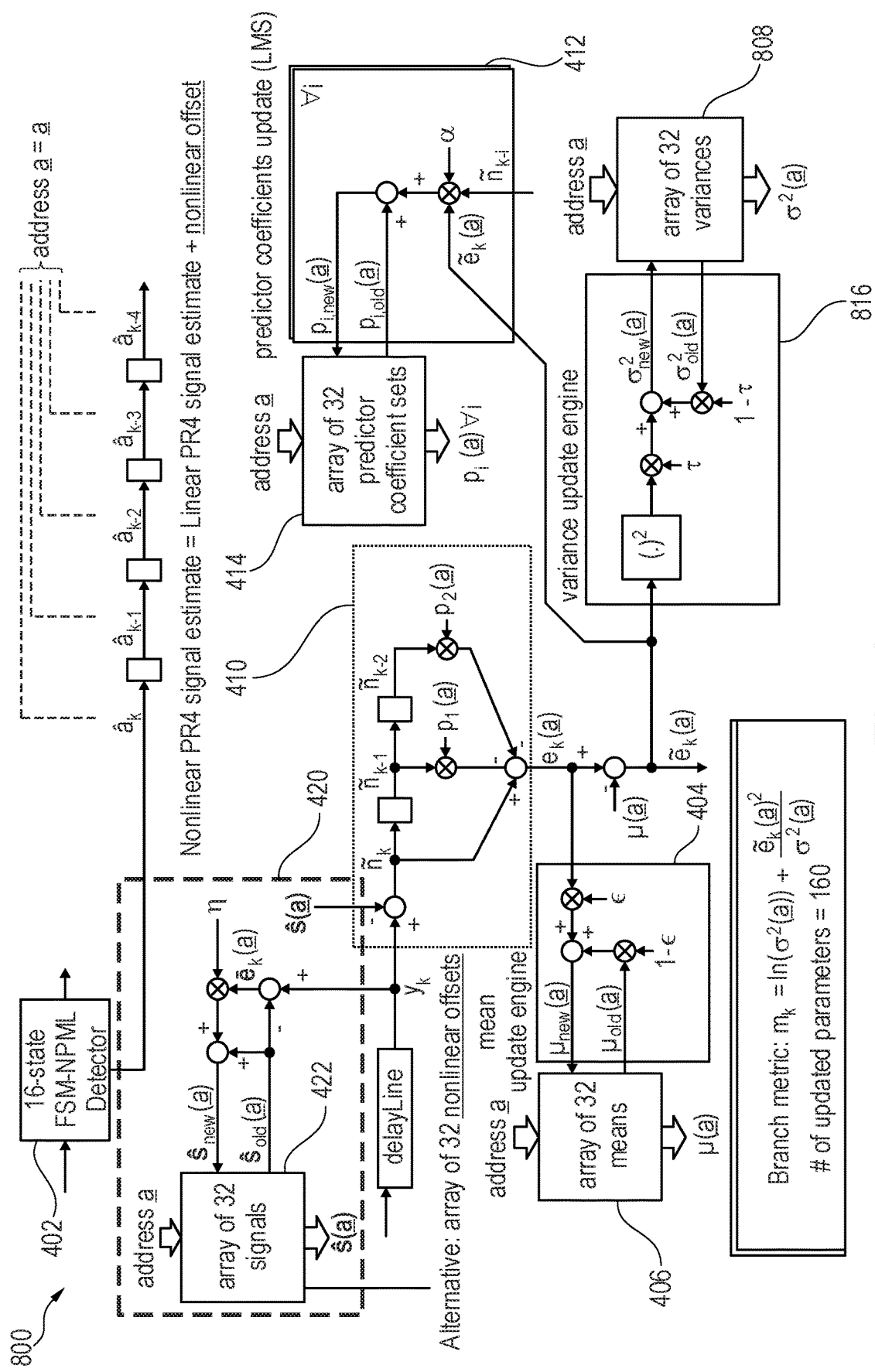
FIG. 8 is a block diagram illustrating components within an update path of a data-dependent noise-predictive maximum likelihood sequence detector including a data-dependent noise mean estimator, a data-dependent variance update engine and a data-dependent predictor coefficients update engine in accordance with an embodiment of the present invention.
Figure 9:
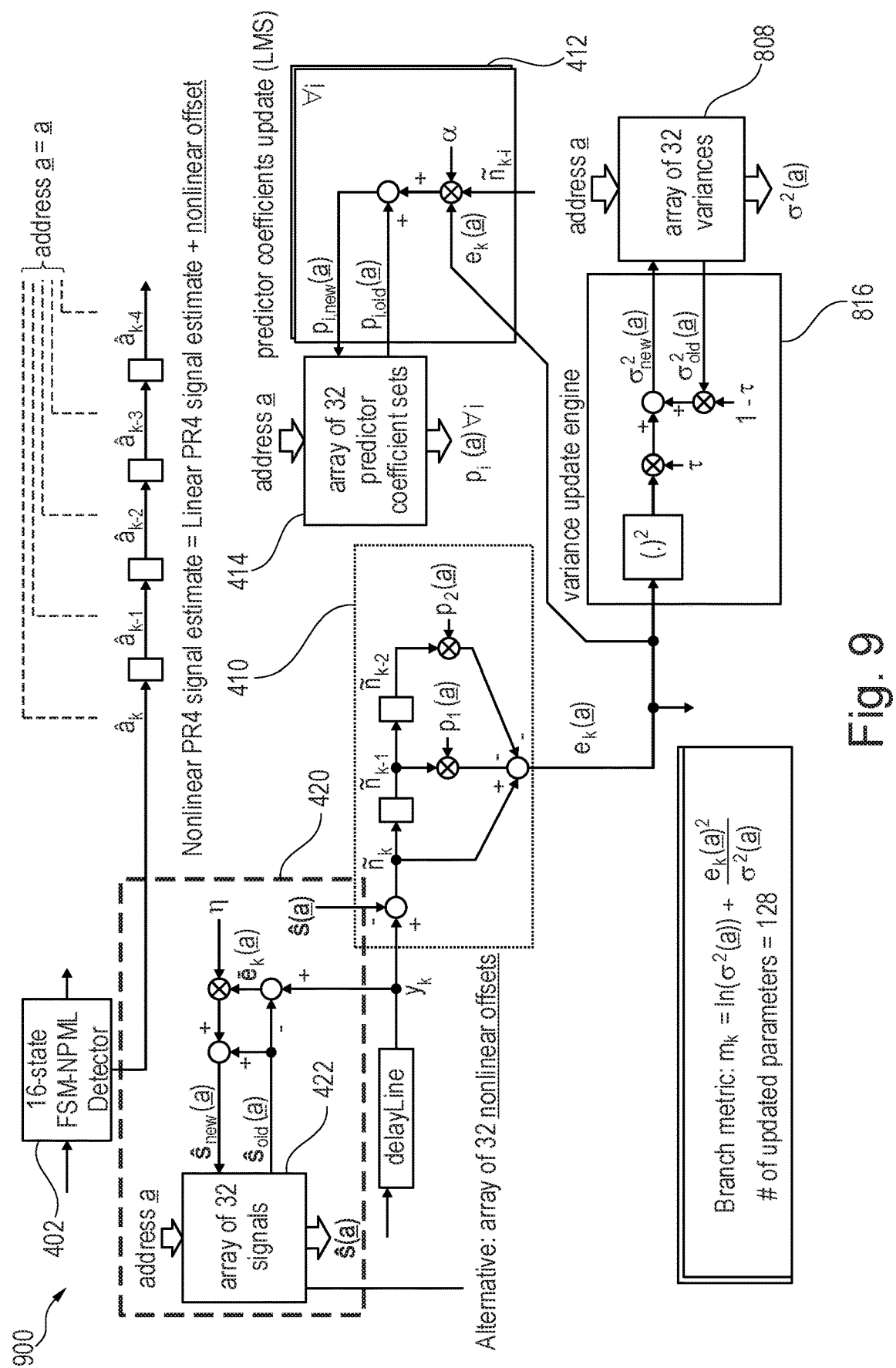
FIG. 9 is a block diagram illustrating components within an update path of a data-dependent noise-predictive maximum likelihood sequence detector including a data-dependent variance update engine and a data-dependent predictor coefficients update engine in accordance with an embodiment of the present invention.

FIGS. 4-9 show diagrams of multiple possible configurations of components within the update path of a data storage system. Without limitation, the drawings assume for illustration purposes that the data-dependent noise-predictive maximum likelihood sequence detectors shown in FIGS. 4-9 are 16-state detectors. FIGS. 4-7 show exemplary configurations for systems with data-independent noise, while FIGS. 8 and 9 show further examples of systems with data-dependent noise. Thus, two classes of finite-state machines (FSM) perturbed by additive noise may be used to model the channel of the data storage system (e.g., the magnetic tape channel). In both models, the nonlinear signal at the output of the channel is represented as the output of a nonlinear table look-up filter. The additive noise in the first channel model may be treated as non-data-dependent colored Gaussian noise, whereas the additive noise in the second channel model may be treated as data-dependent colored Gaussian noise. For both classes of FSM channel models perturbed by additive noise, adaptive detection schemes for mitigating the nonlinearities associated with the write and read processes are disclosed. The disclosed two families of detector structures for non-data-dependent and data-dependent noise may employ the Euclidean and the data-dependent branch metric, respectively. A least mean squares (LMS) algorithm may be used to update the coefficients of the adaptive prediction error filter. Exponential smoothing may be used to update data-dependent means, variances, and nonlinear offsets from the linear PR4 estimate.

Figure 4:
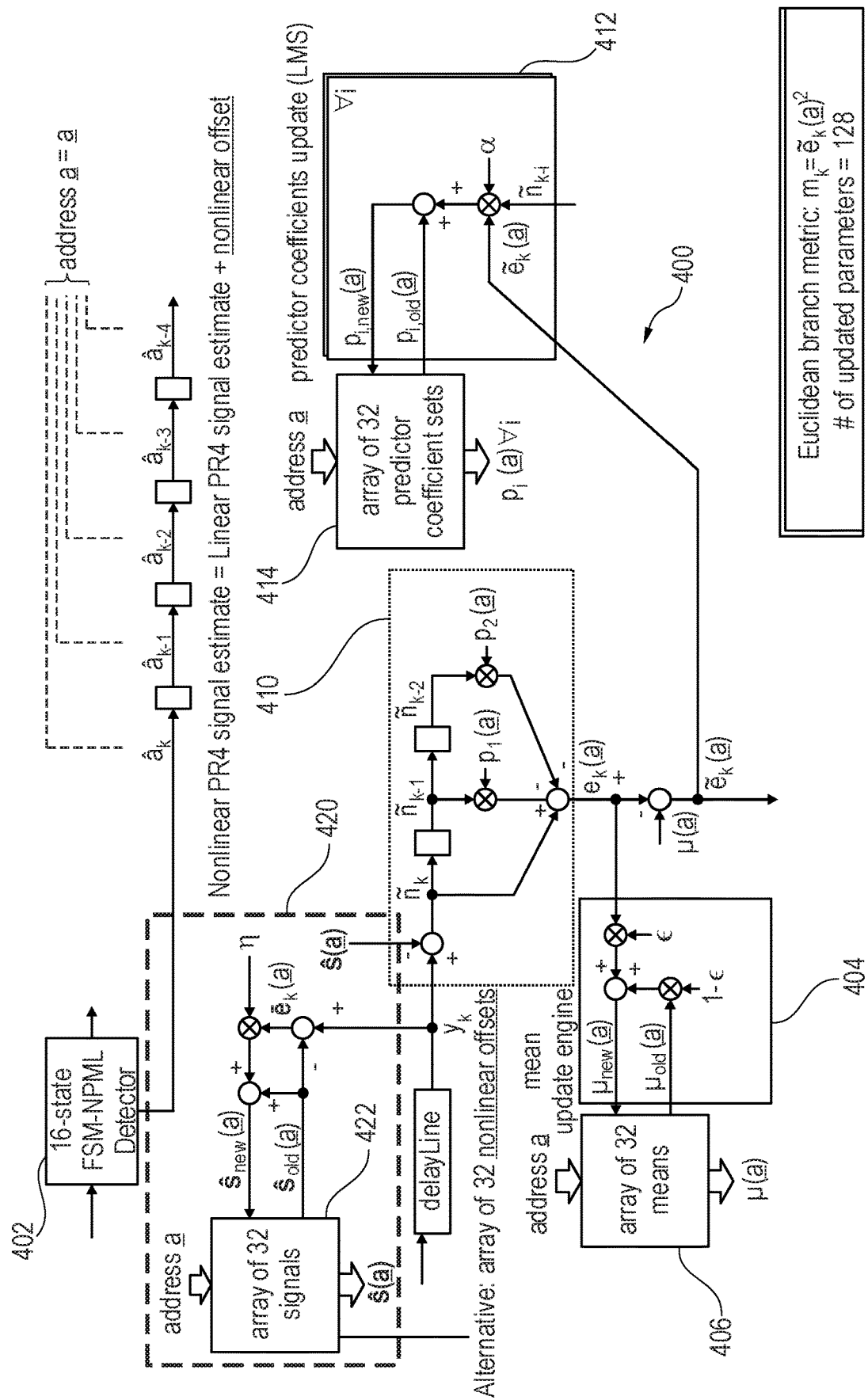
FIG. 4 is a block diagram illustrating components within an update path of a data-dependent noise-predictive maximum likelihood sequence detector including a data-dependent noise mean estimator and a data-dependent predictor coefficients update engine in accordance with an embodiment of the present invention.

A block diagram illustrating a configuration 400 of components within the update path of an adaptive multi-state data-dependent noise-predictive maximum likelihood sequence detector is shown in FIG. 4. The configuration 400 may use any number of discrete blocks or modules, according to various approaches, indicated by the individual blocks, as well as the components within the dashed lines in FIG. 4. Of course, more or less blocks and/or modules are also possible, depending on the amount of adaptability and processing desired for the input signal. Also, some blocks may be used multiple times where appropriate. Further examples of systems with different kinds or configurations 500, 600, 700, 800, 900 of blocks as shown in FIGS. 5-9. The different configurations 400, 500, 600, 700, 800, 900 may comprise further components that are not shown in the drawings for the sake of simplicity of presentation.

The update path configuration 400 receives a detected output stream (e.g., bit stream) from the multi-state data-dependent noise-predictive maximum likelihood sequence detector core 402. The most recent five symbols (e.g., bits) of the received stream are used as a 5-bit address $\underline{a}^*$ assuming $M=2^5=32$ possible bit sequences. Configuration 400 comprises a nonlinear signal estimator 420 configured for calculating an array of M estimated nonlinear signals 422, a multi-tap FIR filter 410 (as a non-limiting example of a noise whitening filter with J=2 taps) configured for calculating a filtered error signal $e_k(\underline{a}^*)$, at least one LMS engine 412 (as a non-limiting example of a filter parameter calculator) configured for calculating an array of M predictor coefficient sets 414 (e.g., 32 sets each comprising a first predictor coefficient ($p_1$) and a second predictor coefficient ($p_2$)) for the bank of noise whitening filters 308 in the detector path, and a data-dependent noise mean calculator 404 configured to calculate an array of M noise means p 406, each respectively calculated for each branch metric of the data-dependent noise-predictive maximum likelihood sequence detector core 402.

Of course, more or less than M noise mean estimates, predictor coefficients, and/or estimated signals may be respectively included in the array of noise means 406, the array of predictor coefficient sets 414, and/or the array of estimated nonlinear signals 422 in order to provide more or less intensive computation for inclusion of the term comprising the respective values in the branch metric calculation. The number of states of the data-dependent noise-predictive maximum likelihood sequence detector core 402 may be related to the number of entries in each array M, according to some predetermined relationship, such as 2 M, 0.5 M, etc. Moreover, M may be related to and/or equal to a number of branches that are possible in the branch metric calculation.

In one example, all noise mean estimates in the array of noise means 406 may be set to zero during initialization or startup of an adaptive data-dependent noise-predictive maximum likelihood sequence detector comprising the update path configuration 400. Moreover, the estimated signals may be initialized with their theoretical values, which may be $\hat{a}_k \cdot \hat{a}_{k-2}$ for each of the 32 possible addresses $\underline{a}=(a_k, a_{k-1}, a_{k-2}, a_{k-3}, a_{k-4})$ when modeling the output of a PR4 equalizer. Similarly, predictor coefficients may be initialized with suitable values such as $p_1=p_2=0$ or $p_1=\frac{1}{3}$, $p_2=\frac{1}{9}$.

It should be noted too that other address lengths and configurations than that shown in FIGS. 4-9 for the sake of simplicity of presentation may be useful or beneficial. For instance, it has been shown that an optimal FSM modeling accuracy for thin-film magnetic-recording channels may be achieved when using 5 past+1 current+2 future symbols as an address of a 256-cell RAM.

The configuration shown in FIG. 4 may be advantageous for data storage systems having time-dependent nonlinearity in the read/write channel, noise characteristics with a spectrum showing a time-dependent and data-dependent deviation from the uniform distribution of white noise, and a time-dependent and data-dependent low-frequency bias of the noise residue. The estimator 420 shown in FIG. 4 may comprise a memory (e.g., a RAM) for storing the estimated signals 422 as well as an update circuitry configured for calculating an estimation error comprising the difference $\bar{e}_k(\underline{a}^*)=y_k-\hat{s}_{old}(\underline{a}^*)$ between the estimated signal $\hat{s}_{old}(\underline{a}^*)$ previously stored for the given most probable sequence $\underline{a}^*$ and the signal $y_k$, and configured for updating the estimated signal using the estimation error as a small correction term, $\hat{s}_{new}(\underline{a}^*)=\hat{s}_{old}(\underline{a}^*)+\eta\bar{e}_k(\underline{a}^*)$ with a small weighting factor $\eta$. The output $\hat{s}_k(\underline{a}^*)$ may be subtracted from the signal to obtain a noise residue signal $\tilde{n}_k(\underline{a}^*)=y_k-\hat{s}_k(\underline{a}^*)$ at the input of update path noise whitening filter 410.

The whitening filter 410 may calculate a filtered error signal $e_k(\underline{a}^*)=n_k-p_1(\underline{a}^*)\tilde{n}_{k-1}-p_2(\underline{a}^*)\tilde{n}_{k-2}$. The filtered error signal may be used by the noise mean calculator 404 to determine an updated noise mean $\mu_{new}(\underline{a}^*)=(1-\epsilon)=(1-\epsilon)\mu_{old}(\underline{a}^*)+\epsilon e_k(\underline{a}^*)$ with a small weighting factor $\epsilon$. The difference $\tilde{e}_k(\underline{a}^*)=e_k(\underline{a}^*)-\mu(\underline{a}^*)$ may then be used by the filter parameter calculator 412 to provide updated filter parameters $p_i(\underline{a}^*)$ ($i \in \{1, 2\}$) by calculating $p_{i,new}(\underline{a}^*)=p_{i,old}(\underline{a}^*)+\alpha\tilde{e}_k(\underline{a}^*)\tilde{n}_{k-i}$ with a small weighting coefficient $\alpha$. Over a space of 32 addresses, the total number of updated values in configuration 400 is 128=32 estimated signals+32 noise means+32·2 filter coefficients. In the detector path, the bank of one or more noise whitening filters 308 may receive the stored filter coefficients 414 to tune the applicable noise whitening filter(s) for each branch. Likewise, the branch metric calculator 308 may use the stored estimated signals 422 and noise means 406 to calculate a Euclidean branch metric $m_k=\tilde{e}_k^2(\underline{a})$ for each of the 32 candidate sequences $\underline{a}$.

Figure 5:
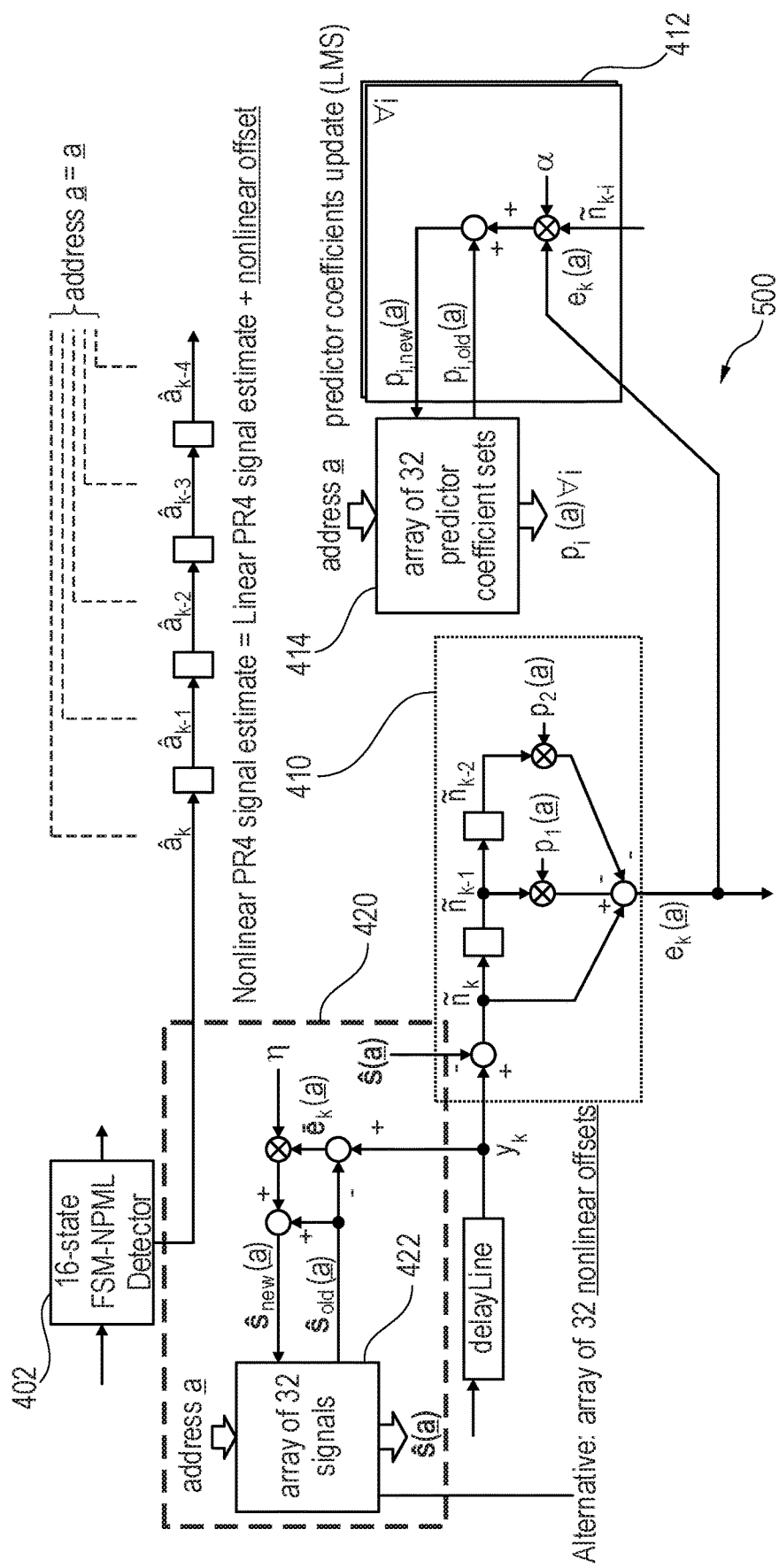
FIG. 5 is a block diagram illustrating components within an update path of a data-dependent noise-predictive maximum likelihood sequence detector including a data-dependent predictor coefficients update engine in accordance with an embodiment of the present invention.

FIG. 5 shows a block diagram of a configuration 500 of components within the update path of an adaptive multi-state data-dependent noise-predictive maximum likelihood sequence detector that differs from configuration 400 in that noise mean calculator 404 is missing. This configuration 500 may be beneficial for data storage systems having time-dependent nonlinearity in the read/write channel and noise characteristics with a spectrum showing a time-dependent and data-dependent deviation from the uniform distribution of white noise. In the configuration 500 shown in FIG. 5, the filtered error signal $e_k(\underline{a}^*)$ may be used as the metric input signal to be input to the filter parameter calculator 412 for the given branch $\underline{a}^*$. Over a space of 32 addresses, the total number of updated values in configuration 500 is 96=32 estimated signals+32·2 filter coefficients. In the detector path, the bank of one or more noise whitening filters 308 may receive the stored filter coefficients 414 to tune the applicable noise whitening filter(s) for each branch. Likewise, the branch metric calculator 308 may use the stored estimated signals 422 to calculate a Euclidean branch metric $m_k=e_k^2(\underline{a})$ for each of the 32 candidate sequences $\underline{a}$.

FIG. 6 shows a block diagram of a configuration 600 of components within the update path of an adaptive multi-state data-dependent noise-predictive maximum likelihood sequence detector that differs from configuration 400 in that the filter parameters $p_1$ and $p_2$ are data-independent, and correspondingly, that the filter parameter calculator is configured for storing and updating these two predictor coefficients 614. Another difference is that also the noise mean $\mu$ is data-independent, and correspondingly, that the noise mean calculator 604 is configured for storing and updating a single noise mean value $\mu$ 606. This configuration 600 may be beneficial for data storage systems having time-dependent nonlinearity in the read/write channel, noise characteristics with a spectrum showing a time-dependent but data-independent deviation from the uniform distribution of white noise, and a time-dependent but data-independent low-frequency bias of the noise residue. The update path noise whitening filter 610 may calculate a filtered error signal $e_k=\tilde{n}_k(\underline{a}^*)-p_1\tilde{n}_{k-1}(\underline{a}^*)-p_2\tilde{n}_{k-2}(\underline{a}^*)$ using the data-independent coefficients $p_1$ and $p_2$.

Similar to the discussion of FIG. 4 above, the data storage system 100 may be configured to use a most probable sequence $\underline{a}^*$ to update the estimated signal $\tilde{s}_k(\underline{a}^*)$. The filtered error signal $e_k$ may be used by the noise mean calculator 604 to determine an updated noise mean $\mu_{new}=(1-\epsilon)\mu_{old}+\epsilon e_k$ with a small weighting factor $\epsilon$. The filter parameter calculator 612 may provide updated filter parameters $p_i (i \in \{1, 2\})$ by calculating $p_{i,new}=p_{i,old}+\alpha\tilde{e}_k\tilde{n}_{k-i}(\underline{a}^*)$ with a small weighting coefficient $\alpha$ and $\tilde{e}_k=e_k-\mu$. The noise mean 606 and the filter parameters 614 may be considered data-independent if $\alpha$ and $\epsilon$ are chosen small enough so that the data dependence incurred by the noise residues $\tilde{n}$ cancels out over multiple iterations. Over a space of 32 addresses, the total number of updated values in configuration 600 is 35=32 estimated signals+1 noise mean+2 filter coefficients. In the detector path, the bank of one or more noise whitening filters 308 may receive the stored filter coefficients 614 to tune the applicable noise whitening filter(s) for each branch. Likewise, the branch metric calculator 308 may use the stored estimated signals 422 and noise mean 606 to calculate a Euclidean branch metric $m_k=\tilde{e}_k^2(\underline{a})$ for each of the 32 candidate sequences $\underline{a}$. While the noise mean 606 and the filter parameters 614 are data-independent, the branch-specific quantities in the detector path are still data-dependent as they depend on the difference between the signal and the estimated signal pertaining to the respective branch.

FIG. 7 shows a block diagram of a configuration 700 of components within the update path of an adaptive multi-state data-dependent noise-predictive maximum likelihood sequence detector that differs from configuration 600 in that noise mean calculator 604 is missing. This configuration 700 may be beneficial for data storage systems having time-dependent nonlinearity in the read/write channel and noise characteristics with a spectrum showing a time-dependent but data-independent deviation from the uniform distribution of white noise. In the configuration 700 shown in FIG. 7, the filtered error signal $e_k$ may be used as the input to the filter parameter calculator 612. Similar to the discussion of FIG. 6 above, the data storage system 100 may be configured to use the most probable sequence $\underline{a}^*$ to update the estimated signal $\hat{s}_k(\underline{a}^*)$ and the filter parameters $p_i$. Over a space of 32 addresses, the total number of updated values in configuration 700 is 34=32 estimated signals+2 filter coefficients. In the detector path, the branch metric calculator 308 may calculate a Euclidean branch metric $m_k=e_k^2$.

FIG. 8 shows a block diagram of a configuration 800 of components within the update path of an adaptive multi-state data-dependent noise-predictive maximum likelihood sequence detector that differs from configuration 400 in that a noise variance calculator 808 is added. This configuration 800 may be beneficial for data storage systems having time-dependent nonlinearity in the read/write channel, noise characteristics with a spectrum showing a time-dependent and data-dependent deviation from the uniform distribution of white noise, a data dependence or other effect causing a time-dependent and data-dependent deviation in the noise variance from unity, and a time-dependent and data-dependent low-frequency bias of the noise residue. In update path configuration 800, the difference $\tilde{e}_k(\underline{a}^*)=e_k(\underline{a}^*)-\mu(\underline{a}^*)$ may be used as the input signal to the filter parameter calculator 412 and the noise variance calculator 816.

In addition to the functions explained for the modules shown in FIG. 4, the noise variance calculator 816 may be configured for storing and updating M noise variances $\sigma^2(\underline{a})$ 808. The M variances 808 may be set to unity during initialization or startup of a data-dependent noise-predictive maximum likelihood sequence detector comprising update path configuration 800. In an alternative configuration, the noise variance calculator 816 may store and update an array of 32 coefficients representing an inverse variance $1/\sigma^2(\underline{a})$ and 32 coefficients representing a logarithmic variance $\ln \sigma^2(\underline{a})$, which may reduce computational complexity for the branch metric calculator 308. In addition to the update schemes described before, the noise variance calculator 816 may provide updated noise variances 808 by calculating $\sigma_{new}^2(\underline{a}^*)=\tau\tilde{e}_k^2(\underline{a}^*)+(1-\tau)\sigma_{old}^2(\underline{a}^*)$ with a small weighting coefficient $\tau$ for the most probable sequence $\underline{a}^*$. Over a space of 32 addresses, the total number of updated values in configuration 800 is 160=32 estimated signals+32 noise means+32·2 filter coefficients+32 noise variances. As the noise variance deviates from its regular behavior, the branch metric calculator 308 in the detector path may calculate a modified Euclidean branch metric $m_k=\ln(\sigma^2(\underline{a}))+\tilde{e}_k^2(\underline{a})/\sigma^2(\underline{a})$. Substituting $\tilde{e}_k$ as applicable to the example of FIG. 8 yields $$m_k = \ln(\sigma^2) + \left[(y_k - \hat{s}_k)\left(1 - \sum_{i=1}^{J} p_i D^i\right) - \mu\right]^2/\sigma^2.$$

FIG. 9 shows a block diagram of a configuration 900 of components within the update path of an adaptive multi-state data-dependent noise-predictive maximum likelihood sequence detector that differs from configuration 800 in that noise mean calculator 404 is missing. This configuration 900 may be beneficial for data storage systems having time-dependent nonlinearity in the read/write channel, a data dependence or other effect causing a time-dependent and data-dependent deviation in the noise variance from unity, and noise characteristics with a spectrum showing a time-dependent and data-dependent deviation from the uniform distribution of white noise. In the configuration 900 shown in FIG. 9, the filtered error signal $e_k$ may be used as the input to the noise variance calculator 816 and the filter parameter calculator 412, which may perform their respective updates using the most probable sequence $\underline{a}^*$ provided by the adaptive data-dependent noise-predictive maximum likelihood sequence detector core 310. Over a space of 32 addresses, the total number of updated values in configuration 900 is 128=32 estimated signals+32 noise variances+32·2 filter coefficients. In the detector path, the branch metric calculator 308 may calculate a modified Euclidean branch metric $m_k = \ln(\sigma^2(\underline{a})) + \tilde{e}_k^2(\underline{a})/\sigma^2(\underline{a})$ using the values stored by the update modules in the update path.

Figure 10:
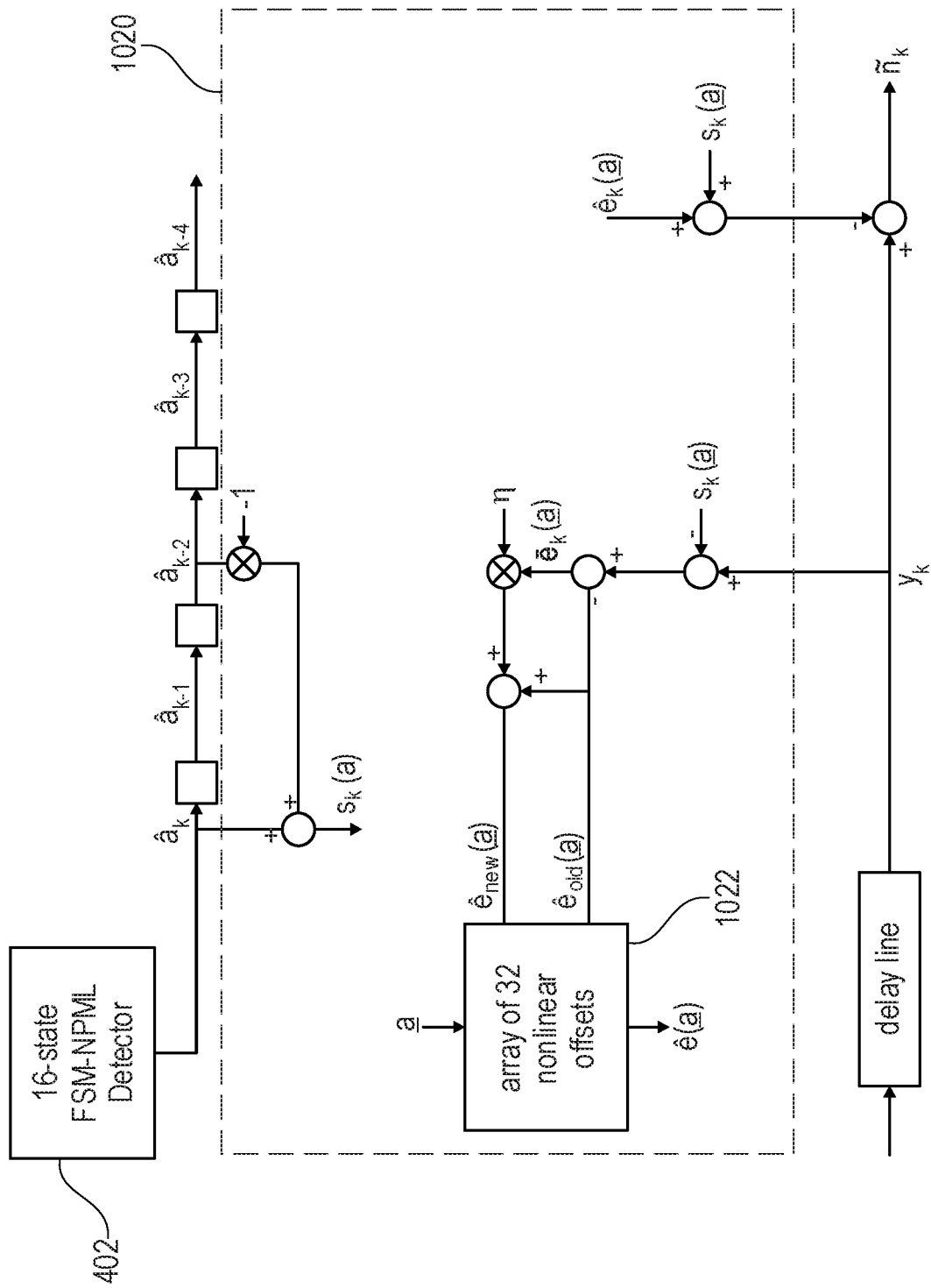
FIG. 10 is a block diagram illustrating an alternative configuration of a signal estimator in accordance with an embodiment of the present invention.

Now turning to FIG. 10, a diagram illustrating an alternative configuration 1020 of the estimator is shown that is adapted for storing and updating the estimated nonlinear offset or portion of the signal. In the example shown, again an array of 32 (chosen without limitation for purely illustrative purposes) estimated nonlinear portions 1022 is maintained by the estimator 1020. As the estimated nonlinear signal $\hat{s}_k(\underline{a})$ is the sum of an estimated linear signal $s_k(\underline{a})$ and the estimated nonlinear portion $\hat{e}_k(\underline{a})$, the noise residue to be processed further by components such as the noise whitening filter 306 can be expressed in terms of the stored nonlinear portion as $\tilde{n}_k(\underline{a}) = y_k - s_k(\underline{a}) - \hat{e}_k(\underline{a})$, where the linear estimate can be obtained in a known way such as through $s_k(\underline{a}) = \hat{a}_k - a_{k-2}$ in the non-limiting example of a PR4 equalizer output. The estimator 1020 shown in FIG. 10 may comprise a memory (e.g., a RAM) for storing the estimated nonlinear offsets 1022 as well as an update circuitry configured for calculating an estimation error comprising the difference $\bar{e}_k(\underline{a}^*) = y_k - s_k(\underline{a}^*) - \hat{e}_{old}(\underline{a}^*)$ between the previously stored estimated nonlinear portion $\hat{e}_{old}(\underline{a}^*)$ for the given most probable sequence $\underline{a}^*$ and the difference between signal $y_k$ and the estimated linear signal portion $s_k(\underline{a}^*)$ and for updating the estimated nonlinear portion using the estimation error as a small correction term, $\hat{e}_{new}(\underline{a}^*) = \hat{e}_{old}(\underline{a}^*) + \eta \bar{e}_k(\underline{a}^*)$ with a small weighting factor $\eta$.

Figure 11:
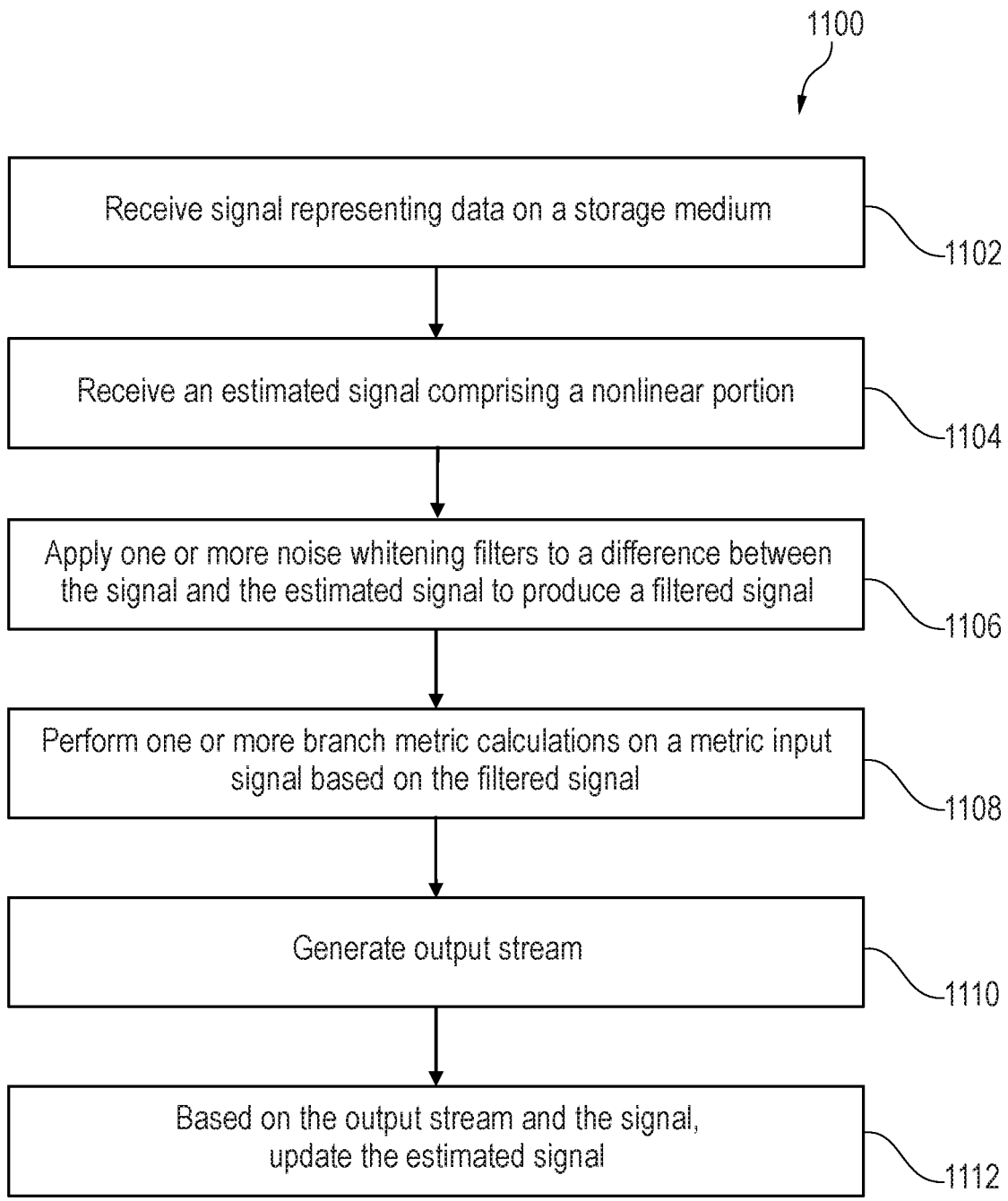
FIG. 11 is a block diagram illustrating steps of a method providing adaptive data detection on a nonlinear channel in accordance with an embodiment of the present invention.

FIG. 11 shows a flow diagram illustrating a method 1100 that may be implemented using the data storage system as disclosed herein. In a step 1102, the method comprises receiving a signal representing data stored on a storage medium. Furthermore, there is a step 1104 of receiving from the estimator an estimated signal comprising a superposition of an estimated linear portion of a partial-response equalizer output and an estimated nonlinear portion of the received signal. A noise whitening filter is applied 1106 to a difference between the received signal and the estimated signal output by the estimator to produce a filtered signal. A metric input signal that is based on the filtered signal is passed on to the branch metric calculator to obtain one or more branch metrics by performing 1108 one or more branch metric calculations. Based on the one or more branch metrics, the adaptive data-dependent noise-predictive maximum likelihood sequence detector establishes a sequence of most probable symbols identified as the data encoded by the signal and generates 1110 an output stream representing the data. Then, the estimator updates 1112 the estimated signal based on the detector output stream and the signal. Preferably, step 1112 may use a delayed version of the signal received in step 1102 to account for the time taken by the noise-whitening filter, the branch metric calculator, and the detector for generating the output stream from the signal.

What is claimed is:

1. A data storage system, comprising:
   a head configured to produce a signal representing data stored on a storage medium;
   an estimator configured to determine an estimated signal from the signal, the estimated signal comprising a superposition of an estimated linear portion of a partial-response equalizer output and an estimated nonlinear portion of the signal;
   a bank of noise whitening filters configured to apply one or more noise whitening filters to a difference between the signal and the estimated signal to produce a filtered signal;
   a branch metric calculator configured to perform one or more branch metric calculations on a metric input signal based on the filtered signal to generate one or more branch metrics; and
   an adaptive data-dependent noise-predictive maximum likelihood sequence detector configured to generate an output stream representing the data based on the one or more branch metrics.

2. The data storage system of claim 1, the estimator being configured for storing the estimated signal as an element of an array of estimated signals, each estimated signal within the array of estimated signals being addressable by an array index comprising a possible tuple of bits in the output stream generated by the adaptive data-dependent noise-predictive maximum likelihood sequence detector.

3. The data storage system of claim 2, the tuple comprising a possible sequence of bits in the output stream generated by the adaptive data-dependent noise-predictive maximum likelihood sequence detector.

4. The data storage system of claim 1, the estimator comprising a memory adapted for storing the estimated signal, the estimator being configured to repeatedly:
   determine an estimation error comprising a difference between a previously stored estimated signal and the signal; and
   update the previously stored estimated signal by a second superposition of the previously stored estimated signal and the estimation error.

5. The data storage system of claim 4, the second superposition of the previously stored estimated signal and the estimation error comprising the estimation error multiplied by a weighting factor larger than zero and smaller than one.

6. The data storage system of claim 1, the estimator comprising a memory adapted for storing the estimated nonlinear portion of the signal, the estimator being configured to repeatedly:
   determine an estimation error comprising a difference between a previously stored estimated nonlinear portion of the signal and a difference between the signal and the estimated linear portion of a partial-response equalizer output; and
   update the previously stored estimated nonlinear portion of the signal by a second superposition of the previously stored estimated nonlinear portion of the signal and the estimation error.

7. The data storage system of claim 6, the second superposition of the previously stored estimated nonlinear portion of the signal and the estimation error comprising the estimation error multiplied by a weighting factor larger than zero and smaller than one.

8. The data storage system of claim 7, the weighting factor having a value between 0.0001 and 0.1.

9. The data storage system of claim 1, each of the one or more branch metric calculations comprising:

$$m_k = \left[(y_k - \hat{s}_k)\left(1 - \sum_{i=1}^{J} p_i D^i\right)\right]^2,$$

where $m_k$ is the branch metric, $y_k$ is the signal input to the estimator, $\hat{s}_k$ is the estimated signal, J is a highest order of the applicable noise whitening filter, $p_i$ are filter parameters of the applicable noise whitening filter, and D represents a delay corresponding to a bit duration.

10. The data storage system of claim 1, further comprising a data-dependent noise mean calculator configured to estimate a data-dependent noise mean from the filtered signal, each of the one or more branch metric calculations comprising:

$$m_k = \left[(y_k - \hat{s}_k)\left(1 - \sum_{i=1}^{J} p_i D^i\right) - \mu\right]^2,$$

where $m_k$ is the branch metric, $y_k$ is the signal input to the estimator, $\hat{s}_k$ is the estimated signal, J is a highest order of the applicable noise whitening filter, $p_i$ are filter parameters of the applicable noise whitening filter, D represents a delay corresponding to a bit duration, and $\mu$ is the data-dependent noise mean.

11. The data storage system of claim 1, further comprising a filter parameter calculator configured to calculate one or more filter parameters for one or more of the noise whitening filters.

12. The data storage system of claim 1, further comprising a data-dependent noise variance calculator configured to estimate a data-dependent noise variance from the metric input signal, each of the one or more branch metric calculations comprising:

$$m_k = \ln(\sigma^2) + \left[(y_k - \hat{s}_k)\left(1 - \sum_{i=1}^{J} p_i D^i\right)\right]^2 / \sigma^2,$$

where $m_k$ is the branch metric, $\sigma$ is the data-dependent noise variance, $y_k$ is the signal input to the estimator, $\hat{s}_k$ is the estimated signal, J is a highest order of the applicable noise whitening filter, $p_i$ are filter parameters of the applicable noise whitening filter, and D represents a delay corresponding to a bit duration.

13. The data storage system of claim 1, further comprising a delay line configured to delay the signal input to the estimator.

14. The data storage system of claim 13, the delay line being configured to delay the signal input to the estimator by at least 0.5 times a nominal delay time of the adaptive data-dependent noise-predictive maximum likelihood sequence detector for detecting one bit.

15. The data storage system of claim 1, the storage medium being a magnetic storage medium or an optical storage medium.

16. The data storage system of claim 1, the adaptive data-dependent noise-predictive maximum likelihood sequence detector having N states, N being selected from the set of 4, 8, 16, 32, 64, and 128.

17. A method comprising:
receiving, from a head, a signal representing data stored on a storage medium;
receiving, from an estimator, an estimated signal comprising a superposition of an estimated linear portion of a partial-response equalizer output and an estimated nonlinear portion of the signal;
applying one or more noise whitening filters to a difference between the signal and the estimated signal to produce a filtered signal;
performing one or more branch metric calculations on a metric input signal based on the filtered signal to produce one or more branch metrics;
generating an output stream representing the data based on the one or more branch metrics; and
based on the signal and the output stream, updating the estimated signal.

18. A computer program product comprising a computer readable storage medium having program instructions embodied therewith, the program instructions being executable by a processing circuit to cause the processing circuit to:
receive, from a head, a signal representing data stored on a storage medium;
receive, from an estimator, an estimated signal comprising a superposition of an estimated linear portion of a partial-response equalizer output and an estimated nonlinear portion of the signal;
apply one or more noise whitening filters to a difference between the signal and the estimated signal to produce a filtered signal;
perform one or more branch metric calculations on a metric input signal based on the filtered signal to produce one or more branch metrics;
generate an output stream representing the data based on the one or more branch metrics; and
based on the signal and the output stream, update the estimated signal.

* * * * *